US011151614B2

(12) United States Patent
Bradley et al.

(10) Patent No.: US 11,151,614 B2
(45) Date of Patent: Oct. 19, 2021

(54) ADVERTISEMENTS BLENDED WITH USER'S DIGITAL CONTENT

(71) Applicant: Comcast Cable Communications, LLC, Philadelphia, PA (US)

(72) Inventors: Bruce Bradley, Wayne, PA (US); Walt Michel, Upper Gwynedd, PA (US); Mark McKelvey, Wayne, PA (US); Rob Holmes, Philadelphia, PA (US); Dan Carella, Philadelphia, PA (US); Bill Sheahan, Philadelphia, PA (US); Ryan Crouch, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1132 days.

(21) Appl. No.: 14/498,541

(22) Filed: Sep. 26, 2014

(65) Prior Publication Data
US 2016/0092935 A1    Mar. 31, 2016

(51) Int. Cl.
*G06Q 30/00*    (2012.01)
*G06Q 30/02*    (2012.01)

(52) U.S. Cl.
CPC ................ *G06Q 30/0276* (2013.01)

(58) Field of Classification Search
CPC .................................. G06Q 30/0276
USPC ...................................... 705/14.67
See application file for complete search history.

(56) References Cited

U.S. PATENT DOCUMENTS

| 5,261,350 | A | * | 11/1993 | Vavrek | A01K 1/0353 |
| | | | | | 119/165 |
| 6,006,183 | A | * | 12/1999 | Lai | G10L 15/22 |
| | | | | | 704/235 |
| 7,711,578 | B2 | * | 5/2010 | Williams | G06Q 50/22 |
| | | | | | 705/2 |
| 7,806,759 | B2 | * | 10/2010 | McHale | G10H 1/368 |
| | | | | | 463/7 |
| 7,996,264 | B2 | * | 8/2011 | Kusumoto | G06Q 30/02 |
| | | | | | 705/14.16 |
| 8,048,289 | B2 | * | 11/2011 | Finkel | G01N 33/6872 |
| | | | | | 205/777.5 |
| 8,166,120 | B2 | * | 4/2012 | Kunz | G06Q 10/107 |
| | | | | | 709/206 |
| 8,200,504 | B2 | * | 6/2012 | Williams | G06Q 10/10 |
| | | | | | 705/2 |

(Continued)

OTHER PUBLICATIONS

Algorithms + Data Structures = Programs, 1974, p. xii-55.*

(Continued)

*Primary Examiner* — David J Stoltenberg
*Assistant Examiner* — Michael I Ezewoko
(74) *Attorney, Agent, or Firm* — Banner & Witcoff, Ltd.

(57) ABSTRACT

Disclosed are systems and methods for generating customized advertising content by combining one or more content items with advertising content. The content items may comprise various forms of media content, including, video, audio, etc. Users may utilize an interface to accesses advertising content and content items. In one embodiment, the user may utilize the interface to integrate one or more content items with advertising content to generate customized advertising content. The interface may be used to further modify the customized advertising content. A computing device may monitor on more user's consumption of customized advertising content for various purposes.

35 Claims, 13 Drawing Sheets

(56) References Cited

U.S. PATENT DOCUMENTS

| | | | | |
|---|---|---|---|---|
| 8,234,218 | B2* | 7/2012 | Robinson | G06F 3/04815 705/54 |
| 8,316,450 | B2* | 11/2012 | Robinson | G06Q 30/02 726/26 |
| 8,387,122 | B2* | 2/2013 | Toomim | G06F 21/6218 726/5 |
| 8,438,234 | B2* | 5/2013 | Kunz | G06Q 10/107 709/206 |
| 8,543,454 | B2* | 9/2013 | Fleischman | G06Q 30/0201 705/14.44 |
| 8,543,460 | B2* | 9/2013 | Svendsen | G06Q 30/0252 705/14.49 |
| 8,702,485 | B2* | 4/2014 | Flury | A63F 13/46 463/34 |
| 8,874,162 | B2* | 10/2014 | Schrader | H04W 4/023 455/550.1 |
| 8,938,690 | B1* | 1/2015 | Khouri | G06Q 50/01 715/808 |
| 8,954,863 | B2* | 2/2015 | Khouri | G06F 3/04812 715/751 |
| 9,032,298 | B2* | 5/2015 | Segal | G06Q 30/02 715/723 |
| 9,104,892 | B2* | 8/2015 | Le Chevalier | G06F 21/31 |
| 9,143,742 | B1* | 9/2015 | Amira | H04N 7/181 |
| 9,146,943 | B1* | 9/2015 | Thakur | G06F 16/24578 |
| 9,177,072 | B2* | 11/2015 | Krishnamurthy | G06F 12/126 |
| 9,207,832 | B1* | 12/2015 | Khouri | G06Q 10/10 |
| 9,304,667 | B2* | 4/2016 | Petitt, Jr. | H04L 65/60 |
| 9,325,752 | B2* | 4/2016 | Vasudevan | H04L 65/403 |
| 9,342,464 | B2* | 5/2016 | Krishnamurthy | G06F 16/958 |
| 9,363,250 | B2* | 6/2016 | Matthews, III | H04W 12/0608 |
| 9,374,374 | B2* | 6/2016 | Steinberg | G06Q 50/01 |
| 9,378,389 | B2* | 6/2016 | Kantor | H04L 67/06 |
| 9,397,969 | B2* | 7/2016 | Torrenegra | H04L 12/1836 |
| 9,418,056 | B2* | 8/2016 | Greenberg | G06F 40/14 |
| 9,420,432 | B2* | 8/2016 | Matthews, III | H04M 1/72577 |
| 9,442,932 | B1* | 9/2016 | Albouyeh | G06F 40/30 |
| 9,448,988 | B2* | 9/2016 | Greenberg | G06F 40/109 |
| 9,467,834 | B2* | 10/2016 | Guday | H04W 4/90 |
| 9,491,522 | B1* | 11/2016 | Trollope | H04N 21/8358 |
| 9,491,589 | B2* | 11/2016 | Schrader | H04W 8/18 |
| 9,524,278 | B2* | 12/2016 | Bargagni | H04L 65/00 |
| 9,573,742 | B1* | 2/2017 | Schmid | E05G 1/024 |
| 9,589,218 | B2* | 3/2017 | Ciavatta | G06K 19/06037 |
| 9,600,464 | B2* | 3/2017 | Greenberg | G06Q 30/0641 |
| 9,621,943 | B2* | 4/2017 | Belz | H04N 21/43637 |
| 9,680,888 | B2* | 6/2017 | Vasudevan | G06F 3/04842 |
| 9,710,982 | B2* | 7/2017 | Matthews, III | G06F 3/0484 |
| 9,736,655 | B2* | 8/2017 | Schrader | G08G 1/096725 |
| 9,747,388 | B2* | 8/2017 | Micucci | G06F 16/90 |
| 9,787,617 | B2* | 10/2017 | Ciavatta | H04L 51/04 |
| 9,813,419 | B2* | 11/2017 | Steinberg | H04L 63/0227 |
| 9,830,360 | B1* | 11/2017 | Mokani | G06F 21/00 |
| 9,892,177 | B2* | 2/2018 | Maquaire | G06F 16/23 |
| 9,902,529 | B2* | 2/2018 | Reinders | A44B 19/305 |
| 9,935,963 | B2* | 4/2018 | Kantor | H04L 63/20 |
| 9,990,426 | B2* | 6/2018 | Micucci | G06F 21/6209 |
| 10,057,204 | B2* | 8/2018 | Miller | H04L 51/36 |
| 10,084,787 | B2* | 9/2018 | Steinberg | G06Q 50/01 |
| 10,126,927 | B1* | 11/2018 | Fieldman | G06F 3/147 |
| 10,140,298 | B2* | 11/2018 | Albouyeh | H04L 51/32 |
| 10,157,237 | B2* | 12/2018 | Sanders | H04L 51/32 |
| 10,182,210 | B1* | 1/2019 | Goetzinger, Jr. | H04N 7/142 |
| 10,216,735 | B2* | 2/2019 | Albouyeh | G06F 3/0605 |
| 10,216,736 | B2* | 2/2019 | Albouyeh | G06F 16/9535 |
| 10,218,709 | B2* | 2/2019 | Chandra | H04L 63/105 |
| 10,249,119 | B2* | 4/2019 | Matthews, III | G06F 3/0484 |
| 10,251,128 | B2* | 4/2019 | Nguyen | H04W 4/14 |
| 10,334,300 | B2* | 6/2019 | Bargagni | H04N 21/2668 |
| 10,382,692 | B1* | 8/2019 | Kumar | G06F 16/51 |
| 10,467,918 | B1* | 11/2019 | Fieldman | G09B 5/10 |
| 10,515,561 | B1* | 12/2019 | Fieldman | H04N 21/47205 |
| 10,540,906 | B1* | 1/2020 | Fieldman | G06F 3/0481 |
| 10,572,135 | B1* | 2/2020 | Fieldman | G09B 5/12 |
| 10,606,860 | B2* | 3/2020 | Maquaire | G06F 16/252 |
| 10,659,422 | B2* | 5/2020 | Yu | G06F 16/958 |
| 10,659,733 | B1* | 5/2020 | Goetzinger | H04N 7/147 |
| 10,701,020 | B2* | 6/2020 | Miller | H04L 51/24 |
| 10,771,464 | B2* | 9/2020 | Steinberg | H04L 63/0245 |
| 10,776,425 | B2* | 9/2020 | Micucci | G06F 16/90 |
| 10,789,034 | B2* | 9/2020 | Rao | G09G 5/006 |
| 2002/0091991 | A1* | 7/2002 | Castro | G06F 9/06 717/106 |
| 2002/0111907 | A1* | 8/2002 | Ling | G06Q 20/29 705/41 |
| 2002/0135477 | A1* | 9/2002 | Dabrowski | F41A 17/04 340/542 |
| 2005/0114759 | A1* | 5/2005 | Williams | G06Q 30/0282 715/221 |
| 2005/0117527 | A1* | 6/2005 | Williams | G06F 19/3418 370/260 |
| 2006/0194255 | A1* | 8/2006 | Finkel | G01N 33/6872 435/7.1 |
| 2007/0089467 | A1* | 4/2007 | Ace-Kirker | A47G 29/10 70/63 |
| 2008/0010139 | A1* | 1/2008 | Elmer | G06Q 30/0208 705/14.11 |
| 2008/0163379 | A1* | 7/2008 | Robinson | G06F 3/04815 726/27 |
| 2009/0063178 | A1* | 3/2009 | Pousti | G06Q 30/04 705/319 |
| 2009/0100359 | A1* | 4/2009 | Sauve | G06Q 30/02 715/762 |
| 2009/0112685 | A1* | 4/2009 | Tunguz-Zawislak | G06Q 30/02 705/14.72 |
| 2009/0165140 | A1* | 6/2009 | Robinson | G06Q 30/02 726/26 |
| 2009/0288150 | A1* | 11/2009 | Toomim | G06F 21/6218 726/5 |
| 2009/0320050 | A1* | 12/2009 | Pousti | G06Q 10/10 719/328 |
| 2010/0037665 | A1* | 2/2010 | Ace-Kirker | G07C 9/33 70/56 |
| 2010/0114596 | A1* | 5/2010 | Williams | G16H 80/00 705/2 |
| 2010/0138233 | A1* | 6/2010 | Williams | G06Q 10/10 705/2 |
| 2010/0145719 | A1* | 6/2010 | Williams | G16H 80/00 705/2 |
| 2010/0250685 | A1* | 9/2010 | Kunz | G06Q 10/107 709/206 |
| 2011/0046980 | A1* | 2/2011 | Metzler | G06Q 30/02 705/3 |
| 2011/0046981 | A1* | 2/2011 | Metzler | H04L 51/32 705/3 |
| 2011/0047404 | A1* | 2/2011 | Metzler | G16H 50/20 714/2 |
| 2011/0047508 | A1* | 2/2011 | Metzler | H04L 51/32 715/810 |
| 2011/0119339 | A1* | 5/2011 | Williams | G06Q 30/0282 709/206 |
| 2012/0052930 | A1* | 3/2012 | McGucken | A63F 13/69 463/1 |
| 2012/0059713 | A1* | 3/2012 | Galas | G06Q 30/0244 705/14.49 |
| 2012/0078727 | A1* | 3/2012 | Lee | G06Q 30/02 705/14.66 |
| 2012/0084151 | A1* | 4/2012 | Kozak | G06Q 30/02 705/14.58 |
| 2012/0084348 | A1* | 4/2012 | Lee | G06Q 30/0241 709/203 |
| 2012/0084349 | A1* | 4/2012 | Lee | G06Q 30/0251 709/203 |
| 2012/0110429 | A1* | 5/2012 | Tzonis | G06Q 10/10 715/230 |
| 2012/0173648 | A1* | 7/2012 | Kunz | G06Q 10/107 709/206 |
| 2012/0210247 | A1* | 8/2012 | Khouri | G06F 3/0482 715/751 |

(56) References Cited

U.S. PATENT DOCUMENTS

| | | | |
|---|---|---|---|
| 2012/0290601 A1* | 11/2012 | Huang | G06K 9/00469 707/769 |
| 2012/0311624 A1* | 12/2012 | Oskolkov | H04N 21/25858 725/25 |
| 2013/0004929 A1* | 1/2013 | Otwell | G09B 5/00 434/350 |
| 2013/0018960 A1* | 1/2013 | Knysz | H04L 65/403 709/204 |
| 2013/0035946 A1* | 2/2013 | Ratan | G16H 40/67 705/2 |
| 2013/0066975 A1* | 3/2013 | Kantor | H04L 63/101 709/205 |
| 2013/0067303 A1* | 3/2013 | Kantor | G06F 16/176 715/205 |
| 2013/0067594 A1* | 3/2013 | Kantor | H04L 67/306 726/28 |
| 2013/0117131 A1* | 5/2013 | Robinson | G06F 21/10 705/14.72 |
| 2013/0174053 A1* | 7/2013 | Torrenegra | H04L 51/32 715/752 |
| 2013/0212115 A1* | 8/2013 | Yerli | G06Q 50/01 707/749 |
| 2013/0227431 A1* | 8/2013 | Vasudevan | H04L 65/403 715/753 |
| 2013/0295872 A1* | 11/2013 | Guday | H04W 4/90 455/404.1 |
| 2013/0295913 A1* | 11/2013 | Matthews, III | H04M 1/72572 455/420 |
| 2013/0298037 A1* | 11/2013 | Matthews, III | H04W 12/0608 715/753 |
| 2013/0303143 A1* | 11/2013 | Schrader | H04W 12/0804 455/418 |
| 2013/0305319 A1* | 11/2013 | Matthews, III | H04W 12/0608 726/4 |
| 2013/0340089 A1* | 12/2013 | Steinberg | H04L 51/12 726/27 |
| 2014/0020115 A1* | 1/2014 | Le Chevalier | G06Q 50/01 726/28 |
| 2014/0096200 A1* | 4/2014 | Brown | H04L 63/105 726/4 |
| 2014/0143028 A1* | 5/2014 | Howe | G06Q 50/01 705/12 |
| 2014/0181013 A1* | 6/2014 | Micucci | G06F 16/90 707/610 |
| 2014/0189010 A1* | 7/2014 | Brown | H04L 51/32 709/204 |
| 2014/0230076 A1* | 8/2014 | Micucci | G06F 21/6209 726/28 |
| 2014/0280206 A1* | 9/2014 | Krishnamurthy | G06F 16/958 707/748 |
| 2015/0011203 A1* | 1/2015 | Schrader | H04W 8/18 455/418 |
| 2015/0019480 A1* | 1/2015 | Maquaire | G06F 16/23 707/609 |
| 2015/0019559 A1* | 1/2015 | Maquaire | G06F 16/907 707/740 |
| 2015/0019981 A1* | 1/2015 | Petitt, Jr. | G06F 3/0482 715/738 |
| 2015/0019982 A1* | 1/2015 | Petitt, Jr. | G08B 5/36 715/738 |
| 2015/0033153 A1* | 1/2015 | Knysz | G06Q 50/01 715/753 |
| 2015/0039698 A1* | 2/2015 | Mavalankar | H04L 51/32 709/206 |
| 2015/0083626 A1* | 3/2015 | Dallman | A61J 1/16 206/438 |
| 2015/0248484 A1* | 9/2015 | Yu | H04L 61/15 707/711 |
| 2015/0365347 A1* | 12/2015 | Sanders | H04L 51/32 709/204 |
| 2015/0381628 A1* | 12/2015 | Steinberg | H04L 63/0227 726/4 |
| 2016/0019167 A1* | 1/2016 | Krishnamurthy | G06F 16/958 711/133 |
| 2016/0066014 A1* | 3/2016 | Belz | H04N 21/42204 725/54 |
| 2016/0162454 A1* | 6/2016 | Bargagni | G06F 16/748 715/745 |
| 2016/0165284 A1* | 6/2016 | Bargagni | H04N 21/41407 725/12 |
| 2016/0196484 A1* | 7/2016 | Ciavatta | G06F 16/9554 235/462.1 |
| 2016/0197968 A1* | 7/2016 | Vasudevan | G06Q 10/107 715/742 |
| 2016/0246770 A1* | 8/2016 | Albouyeh | G06F 3/0605 |
| 2016/0248723 A1* | 8/2016 | Albouyeh | G06F 16/3344 |
| 2016/0248906 A1* | 8/2016 | Schrader | H04W 8/18 |
| 2016/0255919 A1* | 9/2016 | Reinders | B65D 33/2591 |
| 2016/0257448 A1* | 9/2016 | Reinders | B65D 33/2591 |
| 2016/0294762 A1* | 10/2016 | Miller | H04L 51/32 |
| 2016/0294763 A1* | 10/2016 | Miller | H04L 65/1089 |
| 2016/0294890 A1* | 10/2016 | Miller | H04L 51/36 |
| 2016/0294891 A1* | 10/2016 | Miller | G06Q 50/01 |
| 2016/0294894 A1* | 10/2016 | Miller | G06Q 30/0242 |
| 2016/0308877 A1* | 10/2016 | Kantor | H04L 63/0838 |
| 2016/0328902 A1* | 11/2016 | Matthews, III | G07C 9/00309 |
| 2017/0026321 A1* | 1/2017 | Ciavatta | H04L 51/08 |
| 2017/0039867 A1* | 2/2017 | Fieldman | G11B 27/031 |
| 2017/0056766 A1* | 3/2017 | Graziano | H04L 51/046 |
| 2017/0127128 A1* | 5/2017 | Seger | G06F 16/2282 |
| 2017/0214963 A1* | 7/2017 | Di Franco | H04N 21/8166 |
| 2017/0286905 A1* | 10/2017 | Richardson | A47G 29/20 |
| 2017/0315767 A1* | 11/2017 | Rao | G06Q 30/06 |
| 2017/0329843 A1* | 11/2017 | Albouyeh | G06F 16/435 |
| 2017/0329864 A1* | 11/2017 | Micucci | G06F 16/90 |
| 2017/0330293 A1* | 11/2017 | Albouyeh | G06F 16/9535 |
| 2017/0374072 A1* | 12/2017 | Steinberg | H04L 63/20 |
| 2018/0107746 A1* | 4/2018 | Jackson | G06F 16/9535 |
| 2018/0121440 A1* | 5/2018 | Maquaire | G06F 16/2379 |
| 2019/0005419 A1* | 1/2019 | Howard | G06Q 10/06 |
| 2019/0205874 A1* | 7/2019 | Hamid | G06Q 20/204 |
| 2019/0235361 A1* | 8/2019 | Shakarov | G03B 21/10 |
| 2019/0243809 A1* | 8/2019 | Shtaygrud | G06F 9/451 |
| 2019/0378369 A1* | 12/2019 | Washington | G07F 17/3246 |
| 2020/0004783 A1* | 1/2020 | Micucci | H04L 63/08 |
| 2020/0005238 A1* | 1/2020 | Richardson | A47G 29/141 |
| 2020/0104349 A1* | 4/2020 | Negandhi | G06F 16/27 |
| 2020/0126437 A1* | 4/2020 | Fieldman | H04N 21/2187 |
| 2020/0167631 A1* | 5/2020 | Rezgui | G06F 8/30 |
| 2020/0193062 A1* | 6/2020 | Sanders | H04L 67/02 |
| 2020/0193482 A1* | 6/2020 | Howard | H04L 51/10 |
| 2020/0236109 A1* | 7/2020 | Steinberg | H04L 63/20 |
| 2020/0265058 A1* | 8/2020 | Maquaire | G06F 16/252 |
| 2020/0322304 A1* | 10/2020 | Miller | G06Q 30/0242 |

OTHER PUBLICATIONS

Streetlights and Shadows, MIT Press, 2009, pp. 33-47.*
The future of the internet—and how to stop It, Yale University Press, 2008, Chapter(s) 1-9, [emphasis pp. 11-18].*
Aug. 31, 2021—Canadian Office Action—CA 2,902,096.

* cited by examiner

ADVERTISEMENTS BLENDED WITH USER'S DIGITAL CONTENT

BACKGROUND

Advertisers in many industries have long sought to make their advertisements more effective on viewers given the variety of content options at their disposal. These advertisers pay substantial sums of money to have their ads presented during audio and/or video content, with the goal of increasing the number of impressions among viewers. Some advertisers use advertising systems to generate targeted advertising content in hopes that their ads are noticed by viewers. Such advertising systems, however, are rendered less effective when the targeted advertisements are not sufficiently tailored to a particular viewer. There is an ever present need to assist advertisers to improve the effectiveness and efficiency of their advertising content.

SUMMARY

The following summary is for illustrative purposes only, and is not intended to limit or constrain the detailed description. The following summary merely presents various described aspects in a simplified form as a prelude to the more detailed description provided below.

Features herein relate to systems and methods for allowing users to customize incoming advertising content, for example by allowing users to incorporate their own local digital assets, such as pictures of their own house, into incoming advertisements for presentation to the user. Such modified advertisements may be more interesting and engaging for the user. According to one or more aspects of the disclosure, a user interface may provide a user with various options for consuming and/or customizing advertising content. User interfaces may be generated and presented to users via various transmission media, such as Internet websites or other software programs. Electronic advertisements may be presented to users via the user interface. Users may utilize the user interface to access media content and to generate custom advertising content by combining digital content (e.g., photos, video, audio, and the like) with an advertising template. According to additional aspects, users may establish publishing preferences for indicating the one or more users or groups of users that may consume the customized advertising content and the availability of such content for consumption. A computing device may track users' consumption behavior and/or interaction with advertising content. Consumption behavior data can then be sent to an advertisement server for further processing to determine advertising effectiveness, or for other purposes (e.g., virtual achievements, social recognition, etc.). The computing device may also track a user's consumption behavior and/or interaction with advertising content for prize or reward purposes.

According to additional aspects, a user interface which shows advertising content may restrict a user action when generating advertising content. These restrictions may include limiting a user's access to certain content items or advertising content in accordance with parental controls or other user account settings or preferences, ensuring that content being integrated into an advertising template is of a sufficient quality or standard, or in accordance with other options described herein. Users may dictate subject matter preferences for advertising content or content items presented on the user interface by configuring and/or adjusting one or more settings in a user profile.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
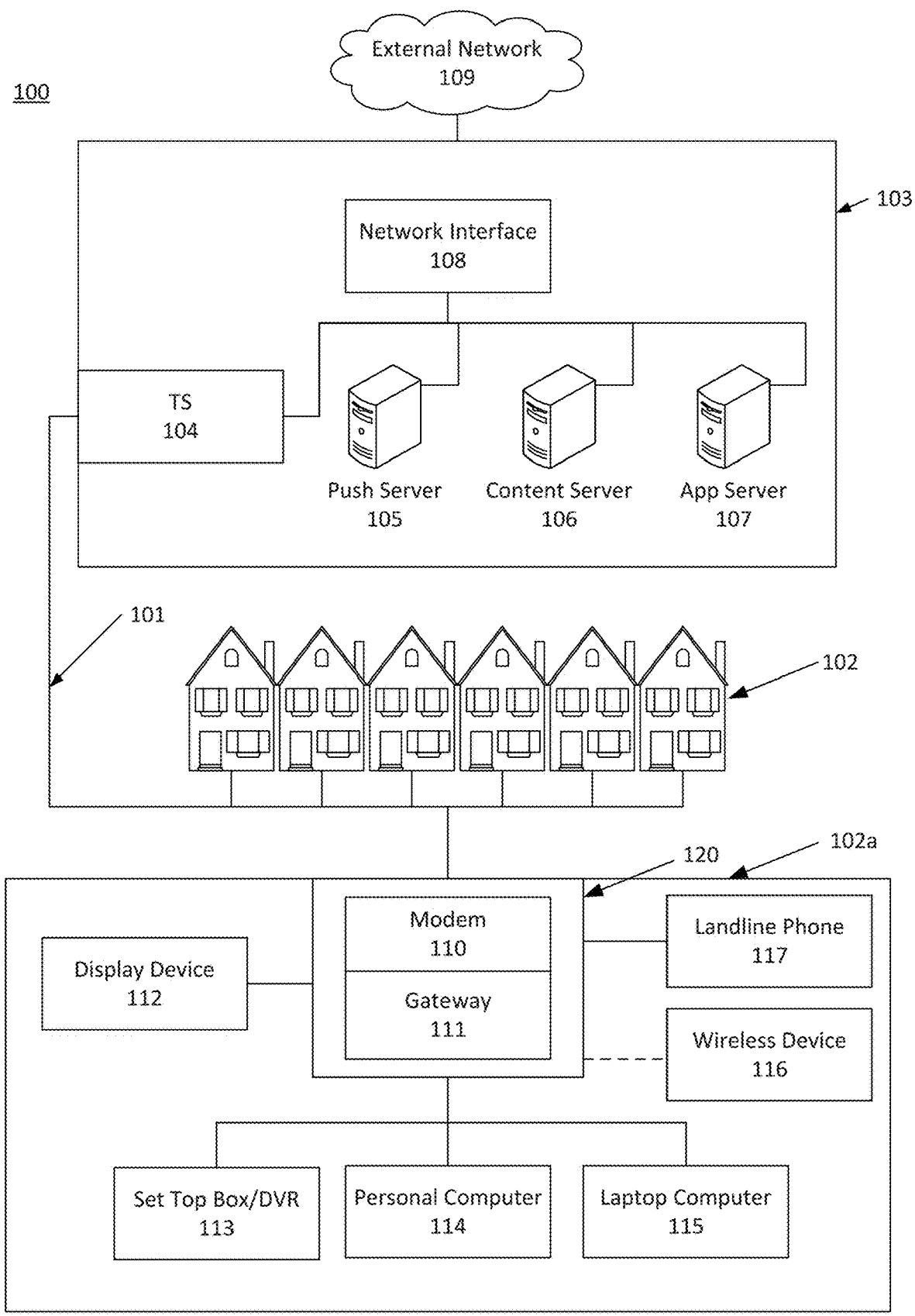
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. In a hybrid fiber-coaxial network, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local wi-fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
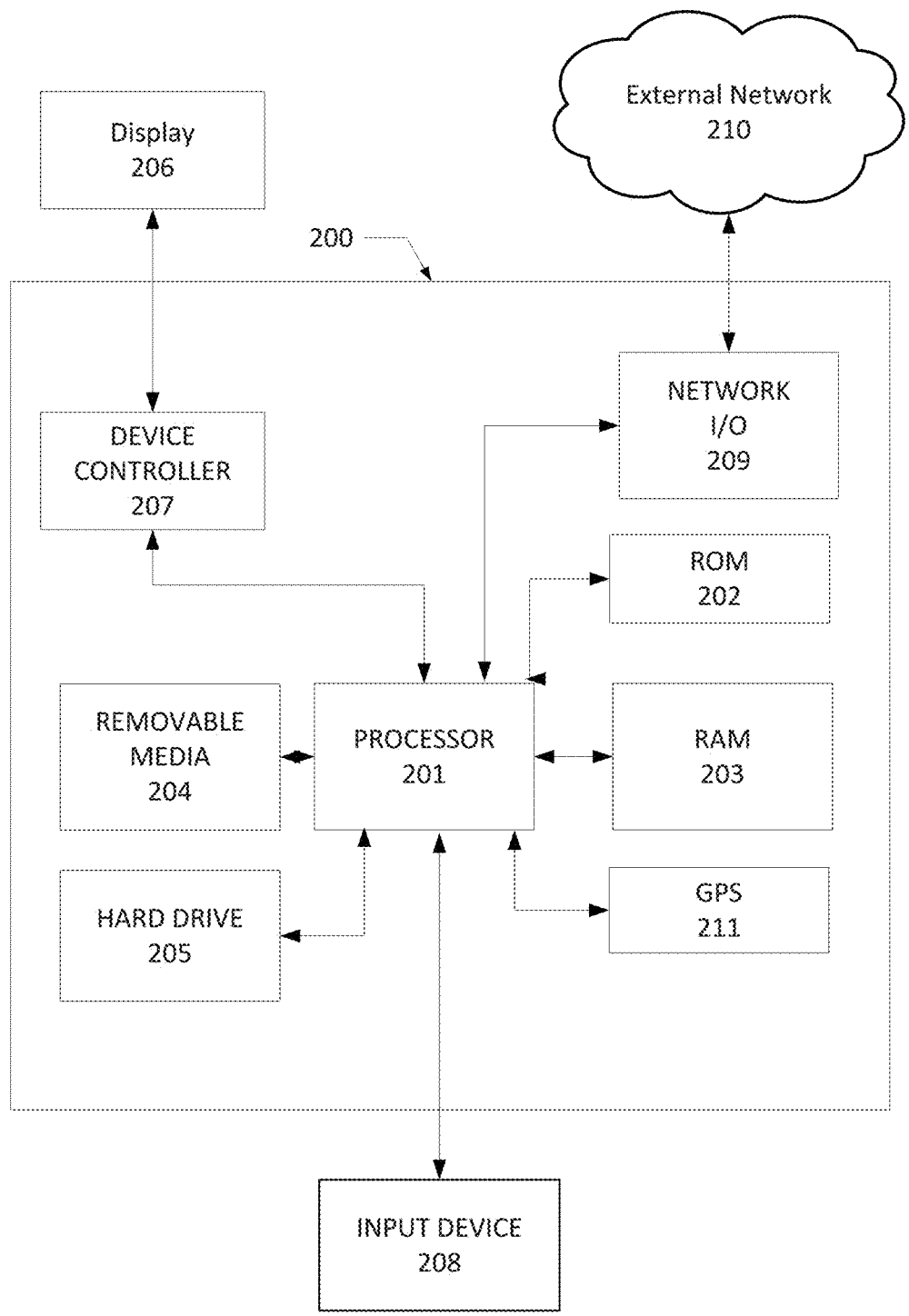
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

In general as described above, some aspects of this disclosure relate to systems and methods for generating advertising content that is customized with content items (e.g., digital content), such as photos, video, audio, and the like. As some more specific examples, systems according to some aspects of this disclosure may allow a user to generate customized advertising content and make the advertising content more engaging for the user by storing personal media content (e.g., photos) on a computing device, and requesting that the stored content be superimposed on and/or integrated with an incoming advertisement. Further aspects of this disclosure relate to identifying and determining criteria for selectively publishing customized advertising content to one or more other users, and for determining the various types of customized advertising content that may be presented to the user. Additional aspects of this disclosure relate to generating consumption metrics based on a user's consumption of the customized advertising content.

Additional aspects of this disclosure relate to graphical user interfaces provided on a computing device (e.g., computing device 200) for customizing advertising content by providing the user with various tools and/or features for integrating personal media content with advertisements (e.g., advertising templates) to make the advertising content more engaging for the user and other users who may consume the advertising content. The computing device may include one or more processors, which may execute instructions of a computer program to generate user interfaces in accordance with one or more aspects of the disclosure. If desired, user interfaces may be initiated from a web-site or web-based application without departing from the scope of the present disclosure, such as through direct interaction with a website or web-based application provided by a service or content provider.

The graphical user interface ("UI") may include elements and features that permit use of any of the features and/or functionality described above and/or any of the features and/or functionality described in more detail below. The UI may be provided on any number of suitable devices, such as display devices 112 (e.g., televisions), personal computers 114, laptop computers 115, wireless devices 116 (wireless laptops, notebooks, tablets and netbooks, mobile phones, personal digital assistants (PDA), etc.). Any suitable display or computing device may provide the UI to a user in accordance with one or more aspects of this disclosure.

Figure 3A:
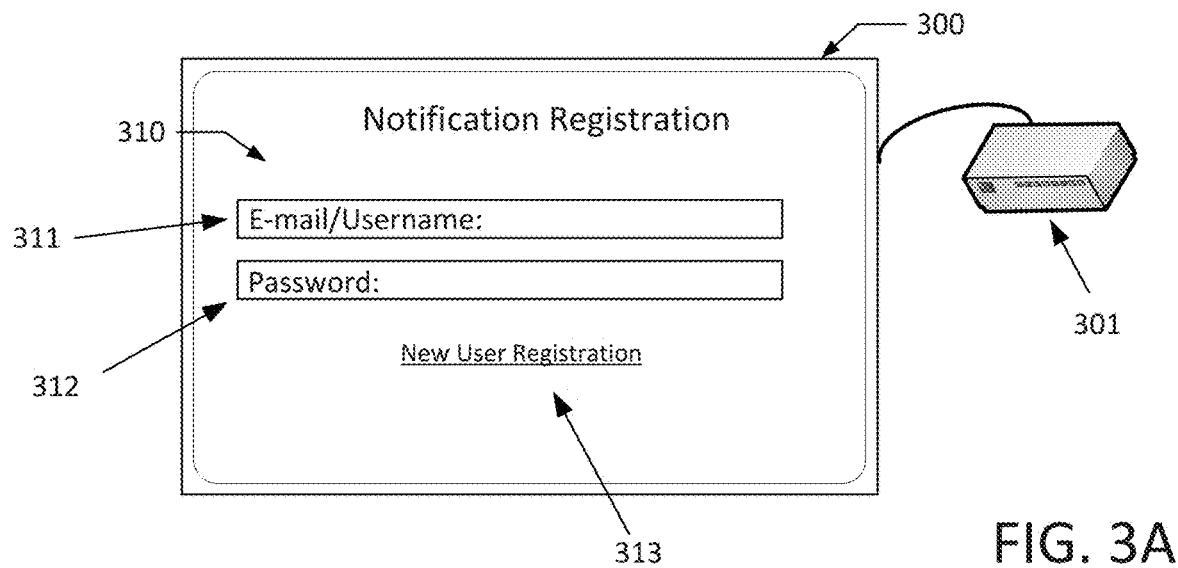
FIG. 3A-E illustrate example user interfaces according to one or more illustrative aspects of the disclosure.
Figure 3B:
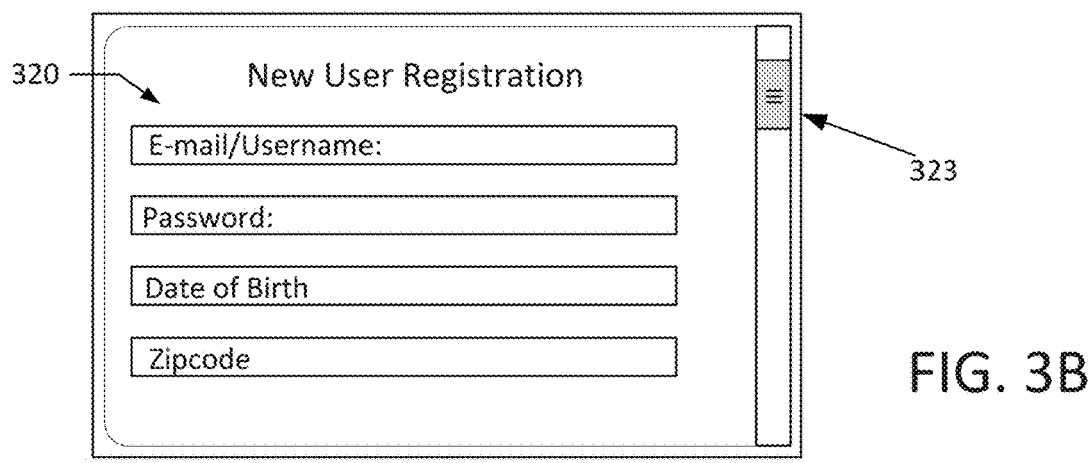

FIGS. 3A-3B illustrate example registration interfaces in accordance with one or more illustrative aspects of the disclosure. A registration interface may be presented to a user when the user first initiates (or executes), via a computing device, a software application or program for customizing the presentation of future incoming advertising content. The user may access the registration interface in a variety of ways. For example, a user may access a registration interface via a computing device, such as computing device 200. FIG. 3A illustrates an example UI screen that may be displayed on display 300. In this illustrated example, UI 310 displays a prompt for a user to provide registration information. In particular, UI 310 is generated on display 300 and includes a first portion 311 prompting entry of an email or username, and a second portion 312 prompting a user for a password. Display 300 may be operatively connected to or integrally formed within a computing device, such as computing device 301. Computing device 301 may include the same features, operations, and functionality as computing device 200 described above. After successful entry of a username/email and password, the user may be granted access to other functions and/or features of the UI. For users who have not yet registered, a user may select element 313 to proceed to a new user registration interface, such as UI 320. As illustrated in FIG. 3B, one or more portions of UI 320 may prompt a user for registration information such as email address, username, password, date of birth, zip code, gender and/or other demographic information, security questions and answers, and the like. Any suitable information may be required for registration.

Computing device 301 may process information (e.g., personal information) received from a user to tailor or customize a user profile associated with the user. For example, a user's zip code may be used to assist the system in tailoring the various advertising content that may be presented to the user based on the user's geographic location. As another example, computing device 301 may utilize the user's date of birth to determine whether certain types of content should be made available to the user (e.g., whether to initiate certain parental control restrictions). As yet another example, computing device 301 may utilize the user's demographic information to assist the system in tailoring the various advertising content and/or content items that may be presented to the user. A user may access additional portions of UI screen 320 not currently displayed in display 300 by using scroll icon 323.

In some embodiments, computing device 301 may generate a first user profile for each registered user. In some of these embodiments, computing device 301 may permit a user to associate (e.g., link) data from other profiles or sources with the first user profile. For example, a user may link the first user profile with a profile associated with a particular content provider. Linking a user profile with specific content providers allows users to adjust the advertisement customization on a provider basis. For example, the user may wish to use their family photos to customize advertisements on NBC, but not to customize advertisements on ESPN. The user may also specify particular advertisers for customization—the user may indicate that soft drink advertisements (or even specific brands) should be customized with the user's family photos, but alcoholic beverage advertisements should not. As another example, a user may import to the first user profile data identifying and/or corresponding to certain user preferences. The computing device may provide the user with one or more interfaces for accessing and/or modifying various user preferences stored in the first user profile.

In other embodiments, users may not be required to register with a software program, website, or web-based application associated with the UI to access advertising content and/or to customize advertisements in accordance with one or more aspects of the present disclosure. A user may be required to register with a software program, website, or web-based application associated with the UI to create a user profile/account or to modify certain notification settings. In some embodiments, non-registered users may be permitted to access only a subset of the user interface features and tools for accessing and customizing advertising content that may be provided to registered users. For example, non-registered users may be permitted to consume customized advertising content, but may be prohibited from further customizing such advertising content. As another example, non-registered users may be prohibited from establishing criteria for the various types of advertising content that may be made available to the user for consumption. Non-registered users may also be prohibited from establishing criteria or preferences for publishing advertising content to other user or groups of users. In some embodiments, registered users may receive certain incentives for creating a user profile, such as, but not limited to, access to UI tools for sharing custom advertisements created by the user and/or receiving various promotional items, prizes, and the like.

Figure 3C:
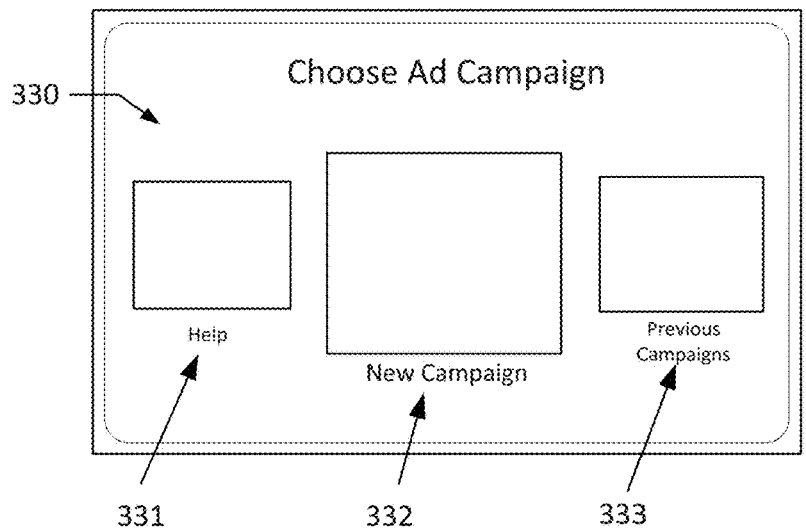
Figure 3D:
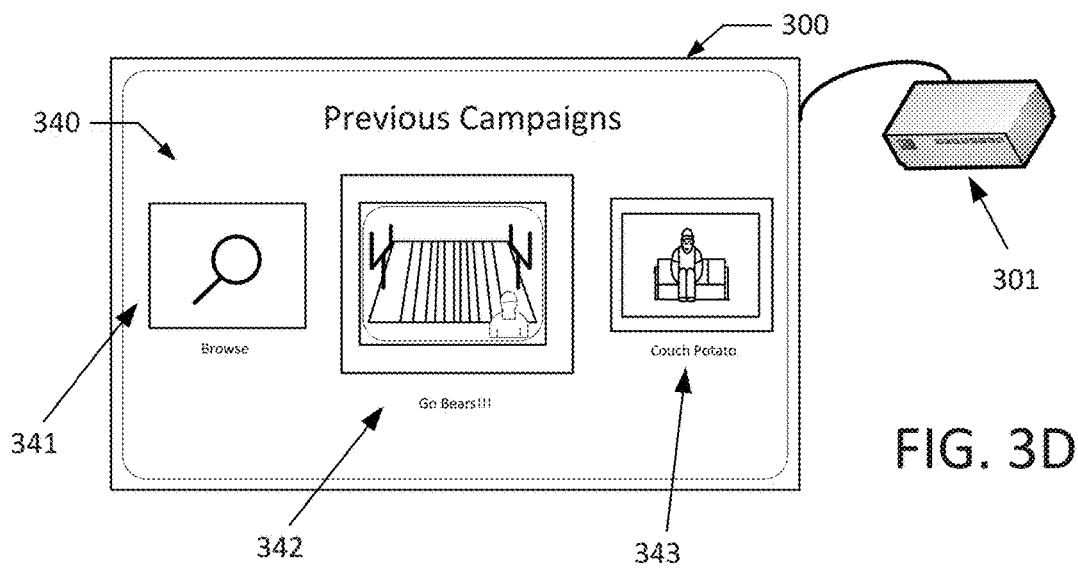
Figure 3E:
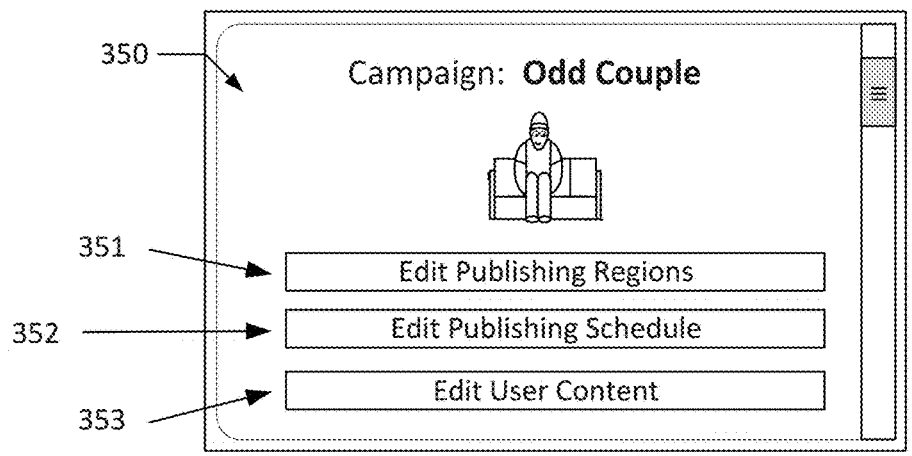

FIGS. 3C-3E illustrate example interfaces that may be used to create and modify customized advertising content in accordance with one or more illustrative aspects of the disclosure. In particular, FIG. 3C illustrates an example UI (i.e., UI 330) that prompts a user to select an advertising campaign. An advertising campaign may include a collection of criteria that the user provides to be used later to customize presentation of one or more advertisements (e.g., advertising content). A user may create different advertising campaigns based on a variety factors and customization preferences. For example, as discussed in more detail below, a user may create a football-related advertising campaign by configuring one or more user customization preferences such that customized advertisements associated with the ad campaign may be presented to users during football games or other sports-related events. As another example, a user may configure one or more preferences to create an advertising campaign relating to particular content services. For instance, a user may select certain customization criteria and/or preferences to create an advertising campaign such that content associated with the advertising campaign may be utilized to customize incoming advertisements appearing on television channels associated with particular content providers (e.g., NBC). Advertising campaigns may be created using other criteria or preferences, such as particular time intervals (e.g., time of day) for displaying advertising content, consumer products types, product brands associated with presented advertising content, types of consumption devices on which the advertising content is presented, and various other criteria.

Advertising campaigns may also include data for identifying user preferences relating to the presentation of future incoming advertisements. Advertising campaigns may also be user-specific, such that a user may consume or access particular advertising content associated with one or more other users. Customized advertising content may be stored on a content server, such as server 106, and may be transmitted to computing device 301 over a network. Users may access previous advertising campaigns by selecting a first portion 333 of UI 330. In some embodiments, first portion 333 may comprise a "previous campaign" icon. Previous advertising campaigns may include advertising content that was previously created or modified by the user or other users.

As an additional potential feature, systems, methods, and computer interfaces in accordance with at least some examples of this disclosure may allow a user to get assistance or "on-line help" during the customization process (e.g., by activating "help" icon 331 in this example interface 330). While any desired information may be provided in response to user interaction with portion 331 of UI 330, in some examples, the systems, methods, and computer interfaces may display to the user information such as a display of instructions to create a customized advertisement. Additional icons may be included in UI 330 that provide the user access to additional functions and/or features of the user interface. A user may access the additional icons by performing predetermined physical gestures on display 300 (e.g., swipe left, swipe right, etc.).

For example, an additional potential feature provided by user interfaces (e.g., UI 330) in accordance with at least some examples of this disclosure may allow a user to access customized advertising content created by one or more other users. Advertising content customized by other users may be stored on a content server, such as server 106. In some embodiments, a portion of UI 330 may allow a user to access customized advertising content created by one or more other users. In one of these embodiments, the user may establish consumption preferences (e.g., personal content filters) for identifying which customized advertising content should be made available on the user interface. Computing device 301 may store a user's consumption preferences and/or personal content filters in a user profile. Any suitable category or type information may be used to establish content filters for various genres or types of customized advertising content made available to a user on the UI. In particular, the UI may provide the users with various options (or menus) for filtering available advertising content, such as by user, by genre, by time, by advertiser, by particular advertisement, etc.

As an example, the UI may permit a user to establish preference for receiving customized advertising content from one or more other users or groups of users. In this example, the user may configure his or her preferences to receive customized advertising content created by members of their family. As another example, the UI may permit a user to receive customized advertising content relating to a specific genre or category of subject matter. In this example, the user may configure his or her preferences to receive customized advertising content relating to sports and/or automobiles. As yet another example, the UI may permit a user to receive customized advertising content based on a predetermined time schedule. In this example, the user may configure his or her preferences to have the customized advertising content shown (e.g., presented, displayed, streamed, broadcasted, etc.) during a certain time of the day, during certain days of the week, and the like. As still another example, the UI may permit a user to receive customized advertising content associated with a particular advertiser. Similarly, the UI may permit a user to receive customized advertising content for a specific advertisement. In this example, the user may configure his or her preferences to receive multiple customized versions of the same advertisement created by one or more different users or groups of users. As another example, the user may configure his or her preferences to receive customized advertising relating to a specific type of product (e.g., soft drink products, footwear products, consumer electronic products, etc.). The user may also configure his or her preferences to receive customized advertising relating to a specific brand of product.

In some embodiments, the UI may permit a user to receive customized advertising content on particular computing devices associated with the user. For example, the user may configure his or her preferences, via the UI, to receive certain types of customized advertising on a particular computing device associated with the user (e.g., a smartphone, tablet, laptop, etc.). For instance, the user may configure his or her preferences to receive customized advertising relating to a first category of subject matter (e.g., sports) on the user's tablet, and to receive customized advertising relating to a second category of subject matter (e.g., automobiles) on the user's laptop or other suitable computing device. As another example, the user may configure his or her preferences to receive customized advertising on particular computing devices based on a predetermined time schedule. For instance, the user may the user may configure his or her preferences to receive customized advertising on the user's smartphone from 9:00 am to 5:00 pm, and to receive customized advertising on the user's tablet from 5:00 pm to 10:00 pm. Users may establish any combination of preferences for receiving customized advertising content on various computing devices without departing from the scope of the present disclosure.

As noted above, customized advertising content made available to a user via the user interface may be limited or restricted based on the user's viewing preferences or personal content filters. Customized advertising content made available to a user via the user interface may also be limited based on the preferences of other users. For example, and as will be discussed in more detail further below, the UI may provide a user with the option of indicating that certain customized advertising, created by that user, should remain private or should only be shared with specific other users or groups of users. In this example, a first user may flag a particular advertisement that he or she has customized as private or may indicate that only members of their family may view the content. As a result, a second user that has not been granted access to the first user's customized advertising content may not be permitted to consume (e.g., view) the first user's content.

FIG. 3D illustrates an example of a user interface (e.g., UI 340) that may be displayed in response to a user selecting a previous advertising campaign as described above in conjunction with FIG. 3C. As a potential feature, systems, methods, and computer interfaces in accordance with at least some examples of this disclosure may allow a user to browse or search through available advertising content by selecting a first portion 341 of UI 340. In some embodiments, first portion 341 may be represented by a "browse" icon on UI 340. In one embodiment, a user may browse customized advertising content that has been created, and/or made available (e.g., published), by other users. As noted above, a user may be presented certain advertising content based on the user's personal content filters or preferences, and the preferences and/or settings of other users.

In another embodiment, a user who has created customized versions of advertising content may browse through such content for selectively determining the various types of advertising content that they wish to share with other users, family, or friends. As illustrated in FIG. 3D, user interface 340 may display recently viewed and/or edited advertising campaigns (e.g., advertising content) that are made available for consumption by the user. For example, UI 340 displays two previous advertising campaigns in a second portion 342 and a third portion 343 of UI 340. A user may access the advertising content by selecting the portion of UI 340 associated with the previous advertising campaign. For example, a user may select icon 343 to access a previous advertising campaign entitled "Couch Potato."

FIG. 3E illustrates an example interface 350 that may be displayed to a user after selecting the portion of UI 340 associated with a previous advertising campaign, such as the couch potato icon 343. As illustrated in FIG. 3E, a user may edit various features and aspects of an advertising campaign. For example, the UI may permit a user to edit geographic publishing regions associated with a particular advertising campaign by selecting a first portion 351 of UI 350. In response to the user's selection, the UI may present the user with one or more interface screens or menus for establishing and/or identifying the user's publishing preferences. In one embodiment, the UI may present the user with a listing of geographic regions (e.g., local regions, national regions, by city, by state, etc.) where the advertising campaign (e.g., advertising content) may be published (e.g., made available for consumption by other users). The user may then identify the one or more locations where the advertising content should be published to other users. In another embodiment, the user may manually identify, via an input device (e.g., input device 208) the particular regions where the advertising content should be published.

As another example, a user may edit a publishing schedule for an advertising campaign by selecting a second portion 352 of UI 350. In response to the user's selection, UI 350 may present the user with one or more interface screens or menus for establishing and/or identifying the user's publishing schedule preferences. In one embodiment, the UI may present the user with a calendar for selecting the various days of the week (or month) that the advertising campaign (e.g., advertising content) may be made available for consumption by other users. In another embodiment, the UI may present the users with a listing of hourly time intervals (e.g., 10a, 1 pm, 2 pm, 9 pm, etc.) that may be selected by the user to indicate one or more publishing preferences. The user may then identify the particular time slots when the advertising content may be published. In other embodiments UI 350 may present the use with general publishing schedule options, such as "occasionally," "often," "daily," "hourly," "weekly," and the like.

A user may be permitted to identify and/or customize various other timing preferences regarding when advertising content may be made available to other users. For example, the UI may provide the user with an option to establish a maximum number of days that the advertising content may be made available to other users. As another example, the UI may provide the user with an option to establish a maximum number of hours that the advertising content may be made available to other users. As yet another example, the UI may provide the user with an option to establish a maximum number of consumption hours for particular advertising content. For instance, a user may establish, via a user interface, that a particular customized advertisement may be consumed by other users for a maximum of 50 hours (e.g., consumption time period). Thus, once the customized advertisement has been consumed for a total of 50 hours by any number of users, the advertising content may no longer be published (e.g., made available for consumption) to those users. Any suitable time frame (e.g., hours, days, weeks, months) may be utilized by the UI to establish consumption thresholds for advertising content.

In some embodiment, the user may customize a publishing schedule for an advertising campaign based on the genre or subject matter of the advertising content associated with the advertising campaign. For example, a user may customize advertising content associated with a sports-related advertising campaign to be made available to users for consumption during sporting events, such as football games, or on a sports television channel. As another example, a user may customize advertising content associated with a food-related advertising campaign to be made available to users for consumption during a television show regarding cooking competitions or a television channel dedicated to food. In some of these embodiments, the UI may transmit to a content provider data relating to the subject matter or other characteristics of advertising content for a user-created advertising campaign. The content provider may process this data along with other user publishing preferences to determine when, and to which users, certain advertising content should be made available.

In one embodiment, the general publishing schedule options may be presented on the user interface as a sliding scale. In this example, the one side of the scale may indicate a user's preference that the advertising content is rarely (or never) made available for consumption, while the other end of the scale may indicate a user's preference that the content always be made available for consumption. In some embodiments UI 350 may present the user with one or more options for publishing advertising content to social media websites or web-based applications. In other embodiments UI 350 may present the user with one or more options for publishing advertising content via electronic mail (or other messaging services) to one or more other users or groups of users.

In still other embodiments, the user may customize a publishing schedule for an advertising campaign based on the format in which the user is consuming media content. For example, the user may establish a publishing schedule or publishing preferences for an advertising campaign based on whether the customized advertising content will be consumed by a user utilizing a video-on-demand ("VOD") platform. For instance, a user may configure publishing preferences such that certain customized advertising content may only be made available via VOD. Additionally or alternatively, a publishing schedule or publishing preferences for an advertising campaign based on whether the customized advertising content will be consumed by a user via traditional linear platforms or services.

In some embodiments, the user may customize a publishing schedule for an advertising campaign based on the delivery format of the media content being consumed by the user. For example, the user may establish a publishing schedule or publishing preferences for an advertising campaign based on whether the customized advertising content is being delivered to other users via internet protocol systems ("IP"). For example, a user may configure publishing preferences such that customized advertising content may only be made available to one or more users that are streaming the customized advertising content over the Internet. Additionally or alternatively, a publishing schedule or publishing preferences for an advertising campaign based on whether the customized advertising content is being delivered to other users via radio frequencies (e.g., QAMs).

When a user publishes customized advertising content, the user may identify one or more other users or groups of users that should be notified when the published content becomes available for consumption. In some embodiments, a computing device may transmit a notification to the one or more users or other users that the user intends to receive a notification. As described above, and discussed further below, the user may utilize a user account or profile to store the identity of these one or more users or groups of users. For example, if a user identifies that a particular customized advertisement should be published to a particular group of users (e.g., family members), when the customized advertising content is published, computing device 301 may transmit a message or electronic notification to each user in the group of users indicating that the customized advertisement is available for consumption. In some embodiments, the message or electronic notification may be transmitted by a server, such as push notification server 105. As another example, a user may send a specific message or notification to a particular user (or group of users) that content is available for them to consume.

Additionally, or alternatively, a user may also adjust user account or profile preferences to indicate whether they wish to "follow" content published and/or created by particular users (e.g., receive notifications or updates regarding content published and/or created by a particular user of interest). For example, a user may adjust their preferences to indicate that they only wish to receive notifications when customized advertising content created by one or more family members is published or made available for consumption. A user may utilize the user interface to identify the various other users they wish to "follow."

As another example, a user may edit the content of an advertising campaign by selecting a third portion 353 of UI 350. In response to the user's selection, UI 350 may present the user with one or more interface screens or menus for editing or further customizing advertising content for a previous advertising campaign. As will be discussed in further detail below with reference to FIGS. 4D, 5A-B, 6A-C, and 7D, a user may have a variety of tools at his or her disposal to customize advertising content. In some embodiments, this customization feature may be made available on the UI registered to and/or associated with the user that created the initial user-modified advertising campaign. Thus, a user who did not create the initial user-modified advertising campaign may not have permission to further edit or modify any advertising content associated with that campaign. In other embodiments, a user (e.g., the user who created the user-modified advertising campaign) may grant one or more other users permission to modify or customize advertising content associated with a particular advertising campaign. In one embodiment, after a user modifies or customizes the advertising content, the user may save (e.g., store in memory) the advertising content as a new advertising campaign.

Referring now to FIG. 3C, users may create a new campaign by selecting a second portion 332 of UI screen 330. When creating a new advertising campaign a user may select one or more advertising templates to customize. Advertising templates can be customized by adding additional content items, such as an image file, audio file, video file, and the like. When a new advertising campaign is created, computing device 301 may store information relating to the new campaign in memory, including any user preferences associated with that campaign.

Figure 4A:
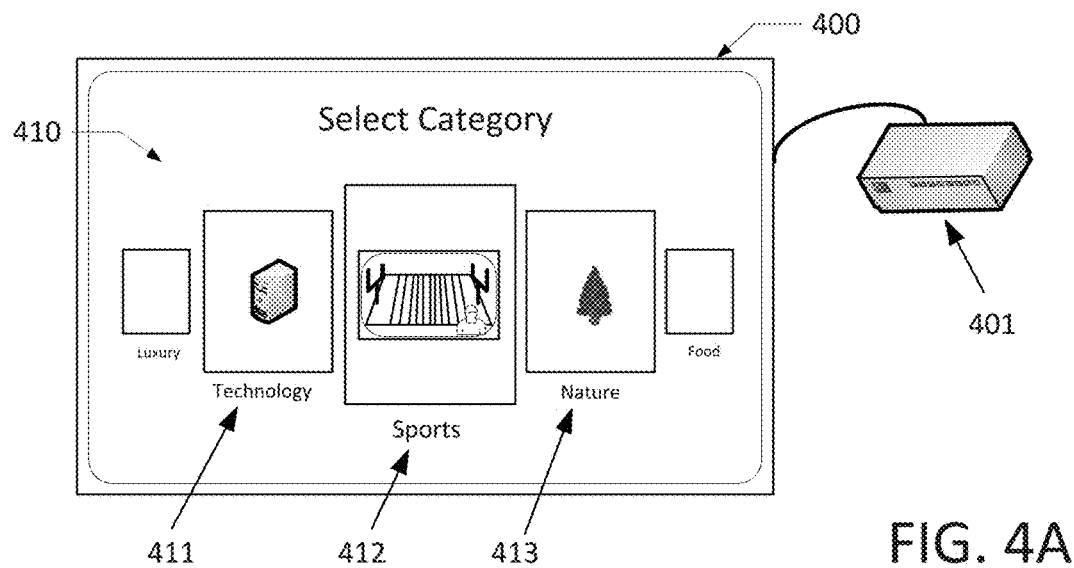
FIG. 4A-G illustrate example user interfaces according to one or more illustrative aspects of the disclosure.
Figure 4B:
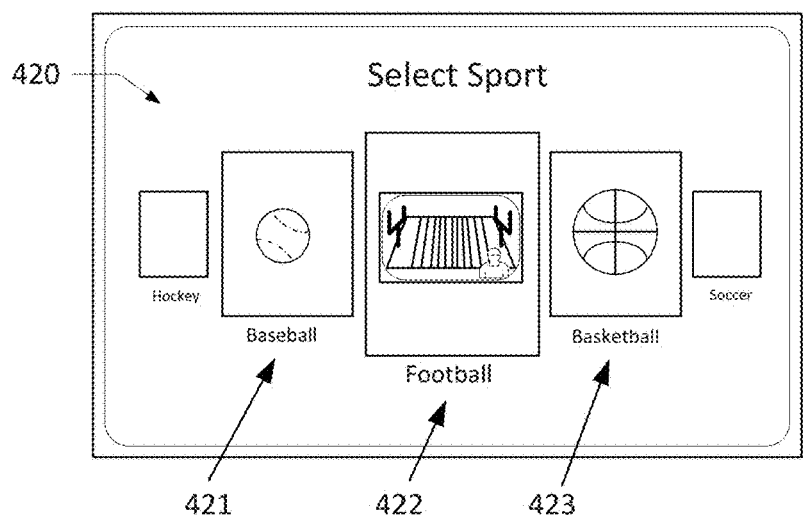
Figure 4C:
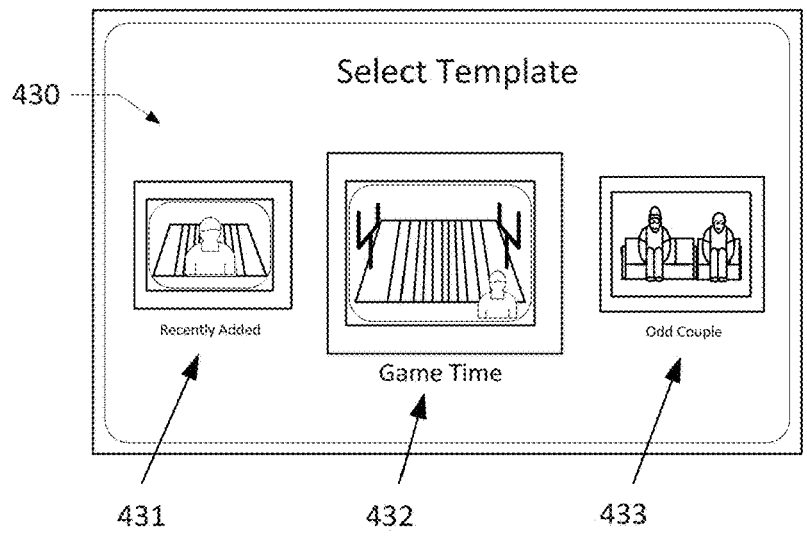

FIGS. 4A-C illustrate example interfaces for selecting an advertising template in accordance with one or more aspects of the disclosure. In particular, FIG. 4A illustrates an example of a user interface (e.g., UI 410) that may be displayed in response to a user initiating the creation of a new advertising campaign as described above in conjunction with FIG. 3C. Computing device 401 may include the same features and functions of computing device 301. Display 400 may be operatively connected to or integrally formed within computing device 401. In this illustrated example, UI 410 may present various categories of advertising content for selection by the user.

Advertising content (e.g., advertising templates) may be classified into various types or categories, such as technology, sports, nature, luxury, food, and the like. For example, users may access one or more advertising templates relating to sports that are available for user customization by selecting a first portion 412 of UI 410 (e.g., "sports" icon 412). As another example, users may access one or more advertising templates relating to technology that are available for user customization by selecting a second portion 411 of UI 410 (e.g., "technology" icon 411). There are a variety of ways in which advertising templates may be classified or categorized on the user interface without departing from the scope of the present disclosure. As yet another example, UI 410 may categorize advertising templates based on the name of the advertiser associated with the advertising content. A user may access additional categories of advertising templates not currently displayed on a screen of UI 410 by performing one or more predetermined physical gestures on display 400 (e.g., swipe left, swipe right, etc.).

FIG. 4B illustrates an example of a user interface (e.g., UI 420) that may be displayed in response to a user initiating the selection of sports icon 412 in UI 410, as described above in conjunction with FIG. 4A. Each category or classification of advertisements may have a plurality of subcategories or sub-classifications. In this illustrated example, UI 420 may present various advertising templates for each selected category of content (e.g., sports-related advertising content). As illustrated in FIG. 4B, advertising templates (e.g., advertising content) may be classified into various types (e.g., subcategories) of sports, such as basketball, football, baseball, and the like. For example, users may access one or more advertising templates relating to basketball that are available for user customization by selecting a first portion 423 of UI 430 (e.g., "basketball" icon 423). As another example, users may access one or more advertising templates relating to football that are available for user customization by selecting a second portion 422 of UI 420 (e.g., "football" icon 422). Each sub-category of sports may be represented by one or more images within a portion of UI 420. A user may access additional types of sports-related advertising templates not currently displayed on a screen of UI 420 by performing one or more predetermined physical gestures on display 400 (e.g., swipe left, swipe right, etc.).

FIG. 4C illustrates an example of a user interface (e.g., UI 430) that may be displayed in response to a user initiating the selection of football icon 422 in UI 420, as described above in conjunction with FIG. 4B. In this illustrated example, UI 430 may present a variety of "base" advertising templates for selection by the user. Each base advertising template may represent an advertisement available for customization by the user. In some embodiments, a base advertising template may comprise advertising content that has yet to be customized (e.g., the original advertisement created by an advertiser). The available advertisements may include video advertisements, audio advertisements, textual advertisements, or some combination thereof. The base advertising template may include data corresponding to certain preconditions and customization limitations for users. Various types of preconditions may be associated with an advertising template without departing from the present disclosure. In some embodiments, an advertising template may be configured such that a user may only integrate certain types of media content (e.g., video, audio, etc.) with the advertising template. In one embodiment, an advertising template may be configured such that a user may only add media content that satisfy predetermined limitations or standards. For example, a user may not be permitted to add media content having one or more "adult" themes to an advertising template having parental control limitations. As yet another example, an advertising template may be configured to restrict user customization options such that the customized advertising content created using the template may only be presented for consumption during certain time intervals, consumed by a predetermined number of users, or consumed a predetermined number times (e.g., views).

Advertising templates may be presented to a user in a variety of ways. For example, a user may access advertising templates that were recently added to a content server (or published by other users) by selecting a first portion 431 of UI 430, (e.g., "Recently Added" icon 431). As another example, a user may select a football-related advertising template entitled "Game Time" by selecting a second portion 432 of UI 430 (e.g., "Game Time" icon 431). A user may access additional football-related advertising templates not currently displayed on a screen of UI 420 by performing one or more predetermined physical gestures on display 400 (e.g., swipe left, swipe right, etc.). Additional advertising templates may be presented on UI 430 based on user preferences or the user's profile. For example, advertising templates presented on UI 430 may be restricted or limited based on a user's preference to view only certain types or genres of advertising templates (e.g., advertising content).

FIG. 4C illustrates an example of a user interface (e.g., UI 440) that may be displayed in response to a user initiating the selection of the "Game Time" advertising template (e.g., Game Time icon 431) in UI 430, as described above in conjunction with FIG. 4C. After selecting an advertising template, a user may experience (e.g., consume) the selected advertisement via UI 440.

Figure 4D:
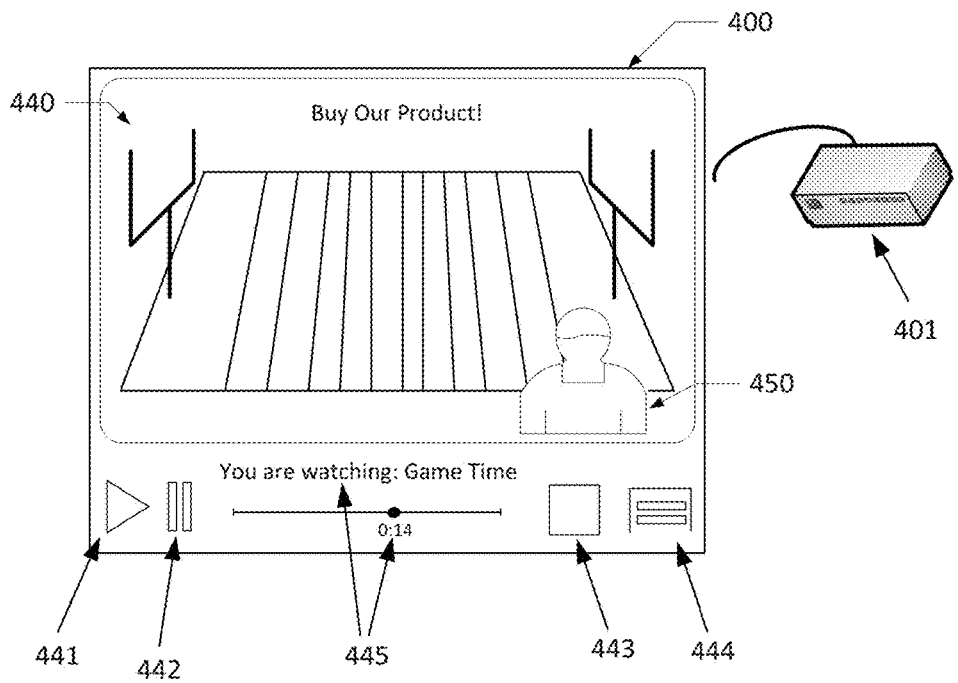

FIG. 4D illustrates an example interface for consuming content associated with an advertising template in accordance with one or more aspects of the disclosure. This example interface may be provided to a user after selecting an advertising template for customization. The interface depicted in FIG. 4D may also be presented to a user when reviewing one or more customizations made to an advertising template or customized advertising content. In some embodiments, the interface may be presented to a user after receiving user input identifying advertising content that the user wishes to consume. For example, a user may browse and select customized advertising content that the user created or that has been created by other users, and may consume the selected content via the interface illustrated in FIG. 4D. As depicted in FIG. 4D, UI 440 provides the user with a series of icons that provide operational functions to experience (e.g., consume) content associated with an advertising template. For example, play icon 441 in UI 440 may permit the user to begin playing the Game Time advertisement (e.g., advertising content). As another example, pause icon 442 in UI 440 may permit the user to pause the Game Time advertisement. As another example, stop icon 443 in UI 440 may permit the user to stop the Game Time advertisement. A variety of other operational controls may be made available to the user via UI 440 (e.g., fast-forward, rewind, etc.). Thus, a user may have an opportunity to consume advertising content associated with an advertising template prior to modifying (e.g., customizing) the content.

A portion 444 of UI 440 may present the user with a menu or list of options for adjusting various settings or features associated with a selected advertising template. For example, an advertising template may include content associated with a particular person or celebrity. For example, as illustrated in FIG. 4D, a portion 450 of the advertising template displayed in UI 440 may present an image or other type of content that may depict a person, spokesperson or celebrity associated with the selected advertising template. In some embodiments, a portion of the advertising template (e.g., portion 450) displayed in UI 440 may display an image of a sports athlete. In other embodiments, one or more portions of an advertising template may present an audio and/or video clip of a sports athlete in conjunction with the advertisement content displayed in UI 440. As will be discussed in more detail below, a user may modify an advertising template to include or exclude one or more persons (e.g., athletes, spokespersons, celebrities, etc.) that may be presented or displayed in conjunction with the advertising content. A portion 445 of UI 440 may present various informational details relating to the advertising template. For example, portion 445 of UI 440 may present the name of the advertisement, the length of the advertisement, the current playing time for the advertisement, the amount of time left in the advertisement, and the like.

Figure 4E:
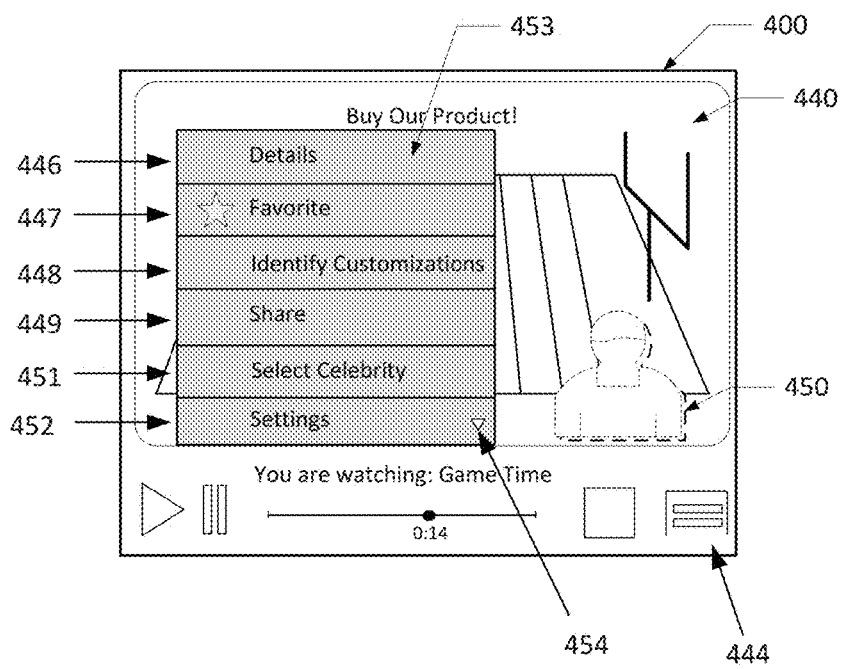

FIG. 4E illustrates an example of a portion 453 of a user interface (e.g., UI 440) that may be displayed in response to a user selecting an option (or menu) made available to a user after initiating menu icon 444 in UI 440, as described above in conjunction with FIG. 4D. Portion 453 of UI 440 may comprise a menu listing a variety of options available to the user for modifying, interacting with, and/or obtaining information about the advertising template. As depicted in FIG. 4E, portion 453 may include a "details" tab 446, that upon selection by a user, may provide the user with additional information associated with the advertising template. Various types of information may be presented to the user, such as the title of the advertising template, when the advertising template was last modified, various content filters or preferences associated with the advertising template, video image data (e.g., resolution, video compression, etc.), the length of the advertisement, an associated file path or location of the advertisement, and the like. Any type of suitable information may be presented to the user after initiating the selection of details tab 446 without departing from the scope of the present disclosure.

As depicted in FIG. 4E, portion 453 of UI 440 may include a "favorite" tab 447 that may permit a user to indicate or identify a particular advertisement as his or her favorite. For example, portion 453 of UI 440 may display an image (e.g., a star icon) in favorites tab 447 when a user identifies an advertisement as his or her favorite advertisement. Computing device 401 may store in memory information relating to any advertisement that has been identified as a favorite advertisement by the user. In some embodiments, such information may be stored in and/or associated with a user's profile. Computing device 401 may process information relating to a user's favorite advertisements in order to recommend custom advertising content to a user. In one embodiment, if a user indicates that a particular category of advertising content is their favorite (e.g., automobile-related advertising content), computing device 401 may adjust one or more preferences or content filters in the user's profile.

In other embodiments, computing device 401 may adjust one or more user preferences based on the user's consumption behavior or history. For example, if the user has recently (or over time) consumed several advertisements relating to one or more categories of advertising content, such as sports-related advertising content, computing device 401 may adjust one or more user preferences, such that sports-related advertising content is presented for user consumption more often. In this example, computing device 401 may also be configured to adjust one or more user preferences, such that the UI (e.g., UI 410) recommends (or presents) more sports-related advertising templates for customization by the user. Similarly, if the user has recently (or over time) consumed several advertisements associated with a particular spokesman, athlete, or celebrity, computing device 401 may adjust one or more user preferences, such that advertising content associated with that particular individual is presented for user consumption more often. As another example, if over a certain time period, the user has not consumed a particular category of advertising content, computing device 401 may adjust one or more user preferences such that said particular category of advertising content is presented for user consumption less often.

There are a variety of ways in which a computing device, such as computing device 401 may monitor the consumption behavior of a user. In some embodiments, a computing device may track a user's consumption behavior by storing in memory information relating to each advertisement a user consumes. In one of these embodiments, the entity maintaining the software program, website, or web-based application associated with the user interface may track and store information relating to each advertisement consumed by one or more users. In another of these embodiments, one or more advertising content providers may track and store information relating to each advertisement consumed by a user.

As discussed in more detail below, in some embodiments, information relating to a user's consumption behavior or history may also be utilized to generate various consumption statistics and/or reports. As another potential feature information relating to a user's content consumption behavior or history (e.g., number of user views) may also be utilized to generate an invoice or billing report to an advertiser. For example, the entity maintaining the software, website, or web-based application associated with the UI may charge a subscription fee to advertisers who wish to have the advertising content presented to users of the UI. In this example, the entity may calculate a subscription fee for an advertiser based, at least in part, on the number of times one or more users have consumed an advertisement associated with that advertiser. In some embodiments, information relating to a user's consumption behavior or history may also be utilized for prize or reward purposes (e.g., a company may provide discount coupons, prizes, or other awards when users view their advertising content, e.g., for promotional purposes, for advertising purposes, as incentives, etc.), for contest purposes, for use tracking purposes, etc.

In one of these embodiments, users may compete in challenges based on an amount of advertising content consumed. In this embodiment, the UI may present to a user a variety of available challenges to select from. One such challenge may include one or more users competing to obtain a certain number of views by (and/or positive comments from) other users for customized advertising content created by the user. In this challenge, users may attempt to get the most number of views within a certain time interval (e.g., one day, one week, etc.), or to be the first to receive a predetermined number of views by other users (e.g., first to 100 views). Such a challenge may encourage a user to create unique and engaging advertising content that may elicit a high level of user consumption and positive comments from other users. After identifying a challenge, a user may identify one or more other users to compete against. The user may select a competitor(s) by identifying other users by an identifier (e.g., username). The UI may also provide the user with an option of randomly identifying and selecting other users who would also like to compete in the same challenge. In some instances, the user may not have any prior affiliation with the competitors (e.g. users) that are randomly selected by the UI. After identifying one or more users to compete in the challenge, the user may adjust various preferences associated with the challenge, such as the criteria for winning the challenge, the amount of time the users have to complete the challenge, and the like.

In some embodiments, users may be provided with rewards or virtual milestones based on an amount of content consumed by the user over certain time periods. As discussed above, the UI may track and record the amount of time a user spends consuming customized advertising content, as well as other metrics associated with the consumption history of the user and/or other users. The UI may present the user with various types of rewards or milestones for consuming certain threshold amounts of advertising content. For example, upon the user viewing 50 hours of advertising content, the UI may present the user with a virtual medallion or some other reward. As another example, upon the user viewing 50 different customized advertisements, the UI may present the user with a virtual medallion or some other reward. Various types of rewards may be presented or offered to users. For example, some rewards may permit a user to unlock new challenges for the user to compete in. Other types of rewards may permit a user to unlock additional interface tools or features for customizing advertising content, while some other rewards may provide the user with additional advertising templates to select from that are not generally made available to users.

As depicted in FIG. 4E, portion 453 of UI 440 may include an "identify customizations" tab 448 that may permit a user to determine the various elements of an advertising template that are customizable. In some embodiments, selecting identify customizations tab 448 may present the user with new UI screens that may identify the various customizable elements in an advertising template. A customizable element may include a particular portion (or portions) of content for an advertising template that may be modified by a user, such as any portion of the advertising template where a user may add, replace, adjust, or remove media content (e.g., image content, video content, audio content, etc.) or perform other customizations. For example, referring to FIG. 4E, after selecting tab 448, the UI may indicate that a portion of the advertising template depicting an image of a celebrity (e.g., element 450) may be removed, replaced, or customized by the user. There are a variety of ways in which the UI may indicate to a user that a portion of an advertising template is customizable. In some embodiments, the UI may use various colors or other indicators to highlight and identify the various portions of an advertising template that are customizable. For example, the advertising template may highlight or visually accentuate those portions of the advertising template that are customizable. As another example, the UI may generate one or more notification windows identifying the one or more portions of an advertising template that are customizable by the user. The notification window may also provide the user with additional information about the various portions of the advertising template that may be customized.

In some embodiments, the UI may permit the user to identify the various customizable elements associated with a particular portion (or time segment) of an advertising template. While consuming the advertising content associated with an advertising template via the UI (e.g., UI 440), the user may pause the advertising content using the pause icon (e.g., icon 442), and subsequently access a menu or selectable option displayed in the UI that is configured to identify customizable elements associated with the current portion or time segment of the advertising content. For example, one such menu or selectable option may include customizations tab 448. Other menus or selectable options for identifying customizable elements of an advertising template may be accessed by initiating menu icon 444. In this example, after selecting customization tab 448, the UI may present the user with a notification window, such as window 460 depicted in FIG. 4F.

Figure 4G:
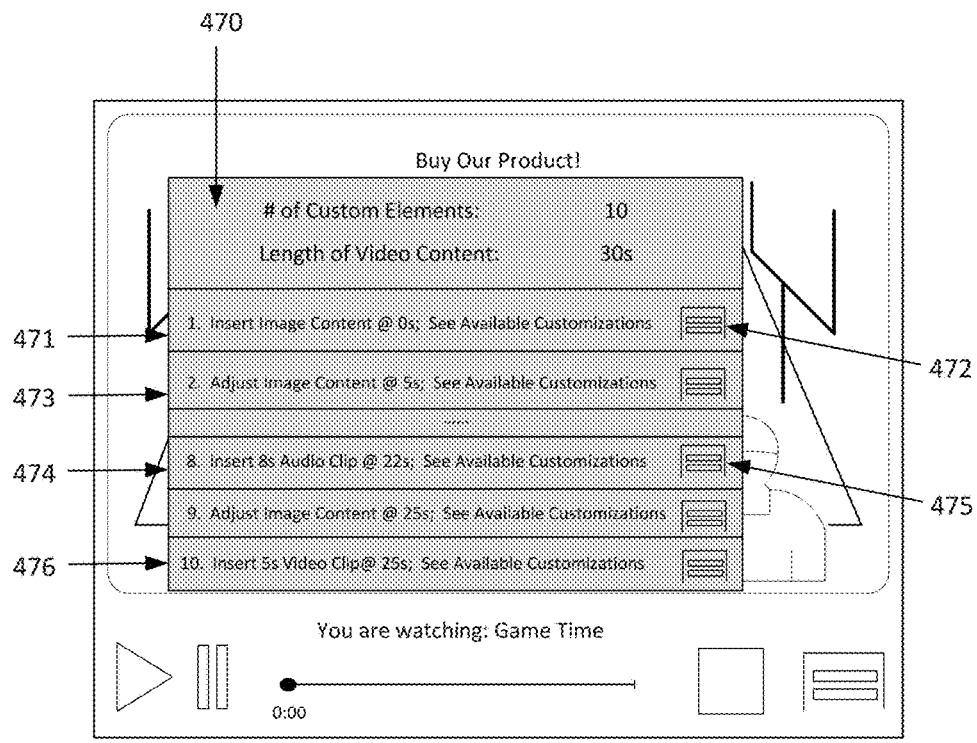
Figure 4F:
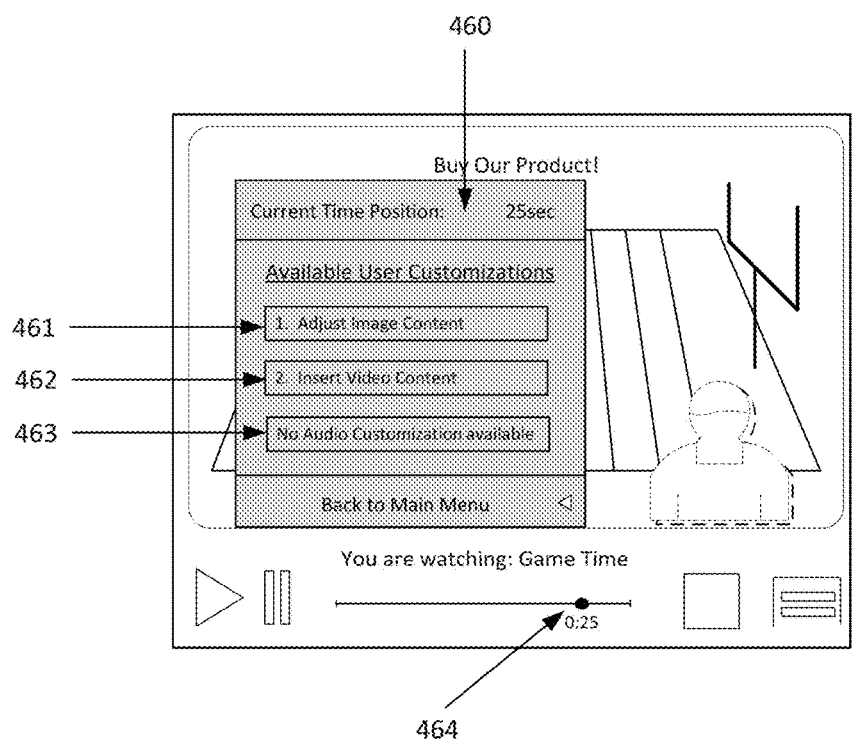

FIG. 4F illustrates an example of a notification window that may be displayed in response to a user selecting an option (e.g., icon, menu, etc.) for identifying customizable elements of an advertising template that may be made available to a user after initiating customizations tab 448, as described above in conjunction with FIG. 4E. In some embodiments, a notification window may be presented to the user after selecting a portion of the advertising template that the user wishes to customize. Notification window 460 may present the user with information identifying one or more elements of an advertisement that may be customized by a user for a particular time segment (or portion) of the corresponding advertising template.

As depicted in FIG. 4F, the user has accessed notification window 460 at the 25 second mark of the advertising template (e.g., the Game Time video advertisement). Notification window 460 identifies the various customizations that the user may make to the advertising template at a particular time segment (e.g., the 25 second mark of the video advertisement). Portion 461 of notification window 460 shows that the user may customize the advertising template by adjusting (e.g., remove, replace, modify, etc.) image content displayed at the 25 second mark of the Game Time video advertisement. By selecting portion 461 of notification window 460, the UI may provide the user with an interface for customizing image content for the advertising template at the 25 second mark of the Game Time video advertisement. For example, the user may be provided with an interface having one or more tools for moving, modifying, or removing the image content in an advertising template. As another example, the user may be provided with an interface for browsing and/or selecting image content that may be used to replace the image content currently included in the advertising template at the 25 second mark of the Game Time video advertisement.

The UI may determine the various elements of an advertising template that are customizable by accessing data files, metadata, and/or other types of data that are associated with the advertising template. This data may be stored along with the advertising template and/or included in separate data files that are stored on a server. As discussed above, entities (e.g., advertisers) that create base advertising templates may provide the data indicating the various portions of an advertising template that may be customized by a user. Entities may continuously or periodically update, modify, remove, or adjust the various portions of an advertising template that may be customized by a user, and as such, the data associated with the corresponding advertising templates may also be updated, and subsequently stored in memory.

Referring back to FIG. 4F, portion 462 of notification window 460 shows that the user may customize the advertising template by inserting video content into the advertising template at the 25 second mark of the Game Time video advertisement. By selecting portion 462 of notification window 460, the UI may provide the user with an interface for customizing video content of the advertising content at the 25 second mark of the Game Time video advertisement. For example, the UI may provide the user with one or more tools for browsing and/or inserting video content into the advertising template. As another example, the user may be provided with an interface for recording video content that may be saved and then inserted into the advertising template at the 25 second mark of the video advertisement.

Portion 463 of notification window 460 shows that the no audio customizations are available in the advertising template at the 25 second mark of the Game Time video advertisement. In some embodiments, the user may access additional information regarding the availability of any audio customization for the advertising template by selecting portion 463 with an input device. For example, the user may "right-click" portion 463 with a mouse (or similar input device), and the UI may generate a display window identifying the one or more segments of the advertising template where a user may insert or customize audio content. For instance, after selecting portion 463, the UI may indicate to the user, via a display window, that a user may insert audio content into the advertising template at the 22 second mark of the Game Time video advertisement. Display windows may also provide the user with the option of accessing the particular time segment of the video advertising template where the audio content may be inserted. For example, the display window may provide the user with an icon, link, or menu, that when selected, may display the Game Time video advertisement in UI 440 at the 22 second mark.

In other embodiments, the user may manually access a particular time segment (e.g., portion, time frame, etc.) of an advertising template by using an input device to move indicator 464 to a desired location. If the user selects a new time segment of the advertising template to customize, notification window 460 may be updated to indicate the elements of the advertising template that may be customized at the different time segment. For example, if the user wishes to access the 22 second mark of the Game Time advertisement, the user may move indicator 464 to a position corresponding to the 22 second mark. The user may then access and/or initiate customizations tab 448 to identify potential elements of the advertising template to customize, such as inserting audio content into the advertising template. As another example, if a user wishes to identify the customizable elements of an advertising template at the 10 second mark of the advertising content (e.g., video advertisement), the user may move indicator 464 to a position corresponding to the 10 second mark. As noted above, the UI may process data associated with the advertising template to determine whether any elements of the advertising template may be customized at the 10 second mark of the video advertisement. Each particular time frame or segment of an advertising template may include varying or different elements that may be customized by a user. In some instances, a particular time segment or portion of an advertising template may have no customizable elements, and the UI may indicate as much to the user via a notification window (e.g., window 460).

Referring back to FIG. 4F, in some embodiments, if a portion of window 460 indicates that one or more elements of an advertising template may be customized by the user, the UI may be configured to provide the user with additional information regarding these customizable elements. For example, if portion 463 of notification window 460 indicated that audio content could be inserted into the advertising template at the 25 second mark of the Game Time video advertisement, upon selecting portion 462, the UI may generate a display window providing the user with information relating to the amount of customization that may be performed. In this example, the display window may show e of the advertising content that may be customized by the user. For instance, the notification window may indicate that the user may customize or edit the last 5 seconds of a 10 second audio clip associated the advertising template.

In some embodiments, the UI may present to the user a notification window that shows information identifying each customizable element of an advertising template. FIG. 4G illustrates an example of a notification window that may be displayed in response to a user selecting an option (e.g., icon, link, menu, etc.) made available to a user after initiating customizations tab 448, as described above in conjunction with FIG. 4E. As depicted in FIG. 4G, notification window 470 may provide the user with information relating to each of the various customizable elements of an advertising template. For example, if the user selects an advertising template that is associated with a 30 second video advertisement, as illustrated in FIG. 4G, notification window 470 may indicate the number of customizable elements associated with the advertising template, the particular time segments or intervals of the video advertisement associated with each customizable element, and the corresponding type(s) of customization that may be performed for each customizable element. Referring to FIG. 4G, the notification window may provide the user with a listing of the various customizable elements associated with an advertising template, which may allow the user to easily browse and identify the various elements (or segments) of an advertisement that they wish to customize without having to review or consume the entirety of the advertising content.

Customizable element 471 in notification window 470 shows that the user may insert image content into the advertising template at the very beginning of the video advertisement (i.e., the 0 second mark). The user may access additional information relating to the available customizations for a particular customizable element by selecting menu icon 472. Selecting menu icon 472 may cause the UI to display an interface screen indicating the available customizations for a particular customizable element.

For example, the available customizations for customizable element 471 may include identifying the one or more locations in the advertising template that the image content may be inserted. In this example, the UI may display a screenshot or frame of the advertisement at the 0-second mark, and provide an indication of where the image content may be inserted. One such example indication may comprise the UI visually accentuating the areas or portions of the screenshot where the image content may be inserted and/or moved. The UI may also be configured to distinguish (e.g., shade, grey-out, etc.) those portions of the screenshot where the image content may not be inserted or moved.

As another example, the available customizations for customizable element 471 may include providing the user with suggested or recommended image content to include in the advertising template. In some embodiments, the suggested image content may include content that was utilized by other users for this particular customizable element when creating customized advertising content based on an advertising template. In other embodiments, the suggested image content may include image content stored on the user's mobile device, computer, or other computing device that conforms to or satisfies any restrictions/limitations associated with the selected customizable element (or the advertising template). As yet another example, the available customizations for customizable element 471 may include identifying one or more digital image filters to apply to the image content that may be inserted into the advertising template. As will be appreciated, there are a variety of digital image (or photographic) filters that may be provided to the user for adjusting one or more characteristics of an image, such as tone, contrast, shadowing, tint, color vibrancy, color temperature, and the like.

In some embodiments, if the user wishes to modify a particular customizable element displayed in notification window 470, the user may select the customizable element and the UI may present the user with a new interface screen that allows the user to begin customizing the selected customizable element. For example, by selecting customizable element 471 via an input device (e.g., input device 208), UI 440 may display the Game Time advertising template at the 0 second mark, and may further provide the user with one or more interfaces for selecting and inserting image content into the advertising template. For instance, the UI may present the user with an interface that allows the user to browse through various items of image content (e.g., photos) that the user may wish to insert into the advertising template. If the user inserts image content into the advertising template in accordance with customizable element 471, the UI may update notification window 470 to indicate that with respect to customizable element 471, the user may subsequently "adjust" the image content that was inserted into the advertising template at the 0 second mark of the video advertisement.

Customizable element 473 in notification window 470 displays the second customizable element associated with the advertising template, and further shows that the user may adjust or modify image content in the advertising template at the 5 second mark of the video advertisement. In some embodiments, the user may replace or remove the image content currently associated with customizable element 473. If the user removes the image content associated with customizable element 473, the UI may update notification window 470 to indicate that with respect to customizable element 473, the user may "insert" image content at the 5 second mark of the video advertisement.

Customizable element 474 in notification window 470 displays the eighth customizable element associated with the advertising template, and further shows that the user may insert audio content (i.e., an 8 second audio clip) into the advertising template at the 22 second mark of the video advertisement. Like customizable element 471, a user may access available customizations for customizable element 474 by selecting menu icon 475. Like customizable element 471, by selecting customizable element 474 via an input device (e.g., input device 208), UI 440 may display the Game Time advertising template at the 22 second mark, and may further provide the user with one or more interfaces for selecting and/or generating audio content to be included in the advertising template. One such interface for generating audio content may be the user interfaces depicted in FIGS. 5A and 5B, which will be discussed in more detail below. Lastly, customizable element 476 in notification window 470 displays the final customizable element associated with the advertising template, and further shows that the user may insert video content (i.e., a 5 second video clip) into the advertising template at the 25 second mark of the video advertisement. Like customizable element 471, by selecting customizable element 476 via an input device (e.g., input device 208), UI 440 may display the Game Time advertising template at the 25 second mark, and may further provide the user with one or more user interfaces for selecting and/or generating video content to be included in the advertising template.

Referring back to FIG. 4E, portion 453 of UI 440 may also include a "share" tab 449 that may permit a user to share the advertising template with one or more other users. In some embodiment, in response to selecting share tab 449, computing device 400 may publish content associated with the advertising template to one or more users according to established (or default) publishing criteria. In embodiments where the advertising template has already been shared with one or more other users, tab 449 may comprise a "private" tab that may permit a user to no longer share the advertising template. As depicted in FIG. 4E, portion 453 of UI 440 may also include a "settings" tab 452 that may provide the user with additional options for modifying various features or aspects of the user interface, the user's profile, and the like. For example, in response to selecting setting tab 452, the user may be provided with a list of options, one of which may permit the user to edit publishing settings or preferences for the advertising template. In some embodiments, a user may access additional tabs not currently displayed in portion 453 of UI 440 by performing one or more predetermined physical gestures on display 400 (e.g., swipe down, swipe up, etc.).

As an additional potential feature, portion 453 of UI 440 may include a "select celebrity" tab 451 that may permit a user to include, remove, or modify content within an advertising template that may be associated with a particular person (e.g., celebrity, athlete, spokesperson, etc.) featured in the advertisement. For example, referring to FIG. 4E, after selecting tab 451, UI 440 may permit the user to identify and/or select content displayed on UI 440 that may be associated with the particular person that the user wishes to modify and/or exclude. As depicted in FIG. 4E, after a user selects the desired content, portion 450 of the advertising template displayed in the UI may visually indicate that the image content has been selected (e.g., by displaying dotted lines around the content). Once selected, the UI may provide the user with one or more operational tools for removing and/or modifying the selected content. For example, a user may remove the selected image content from an advertisement by using a "cutting" tool displayed on the user interface (not shown).

As yet another example, a user may replace the selected content with content corresponding to and/or associated with a different person or celebrity. In this example, UI 440 may present the user with a listing of content items that are associated with other persons or celebrities that may be added to the advertising template. After selecting the desired content (e.g., content item), the user may add the content to the advertising template. Computing device 401 may provide the user with a separate UI for displaying the other types of content that may be added to the advertising template. Additionally, the user may be provided with a separate interface for adding the selected content associated with the particular person (e.g., spokesperson, celebrity, etc.) to the advertising template.

In some embodiments, "select celebrity" tab 451 may permit a user to add content items associated with a person or celebrity to the advertising template. For example, if an advertising template does not include any content associated with a person or celebrity, a user may initiate the selection of select celebrity tab 451 to identify and then add content items associated with a person or celebrity to the advertising template. Upon selection of tab 451, UI 440 may present the user with a listing of available content items associated with particular persons or celebrities that may be added to the advertising template. In embodiments where a user is not permitted to add, modify, or remove content in an advertising template that may be associated with a particular person or celebrity, select celebrity tab 451 may not appear in portion 453 of UI 440. Alternatively, portion 453 of UI 440 may be altered to indicate that a user is not permitted to add, modify, or remove content associated with a particular person or celebrity. For example, tab 451 may appear "greyed out" in portion 453 of UI 440 if the user is not permitted to modify content in the advertising template that is associated with a particular person or celebrity, or if no content items are available that corresponds to the particular person or celebrity.

A user may access additional tabs in portion 453 of UI 440 by selecting element 454, which may permit a user to scroll thru additional tabs that are not currently displayed on the UI. One example of an additional tab that may be presented to the user is a "rename tab," which may allow a user to modify the name associated with an advertising template. For example, the user may modify the name "Game Time" to any other desired name.

In some embodiments, an advertising template may be configured to include content associated with a plurality of persons or celebrities. For example, in accordance with at least some aspects of this disclosure described above, a user may add to the advertising template a first content item (e.g., audio content, textual content, a static image, digital video content, animated video content, etc.) that may be associated with a first person (e.g., celebrity). After adding the first content item, the user may subsequently add to the advertising template a second content item (e.g., video content) associated with a second person. In other embodiments, the amount and/or types of content that may be added to an advertising template may be limited based on a variety of factors, such as available content, content restrictions associated with an advertising template, and the like. For example, content stored within an advertising server may be associated with particular advertising templates.

Computing device 401 may not permit a user to add content to an advertising template if the desired content is not associated with and/or suitable for an advertising template. In one of these embodiments, a content server, such as content server 106, may manage the various permissions and restrictions for content stored on the server. For example, content may also be stored in content servers that are associated (e.g., affiliated) with one or more specific advertisers. The UI may also be configured to permit the user to identify particular restrictions on user-created customized advertising content such that certain content items may not integrated with (e.g., added to) said advertising content by other users. For example, a user may identify certain preferences, via the user interface, indicating the types of content that may be added to customized advertising content created by the user. In this example, the UI may modify metadata or other types of data associated with the advertising content to reflect the various user preferences and restrictions identified by the user. In another example, the user may indicate, via the user interface, whether a particular customized content may be modified or further customized by other users. In still another of these embodiments, an advertising library module for the software program, website, or web-based application may manage the various permissions and restrictions for the content made available to a user. In some instances, the advertising library module may request, from a content server, information relating to the various permissions and restrictions for content stored on the server. In some embodiments, advertising library module may be located within computing device 401.

Figure 5A:
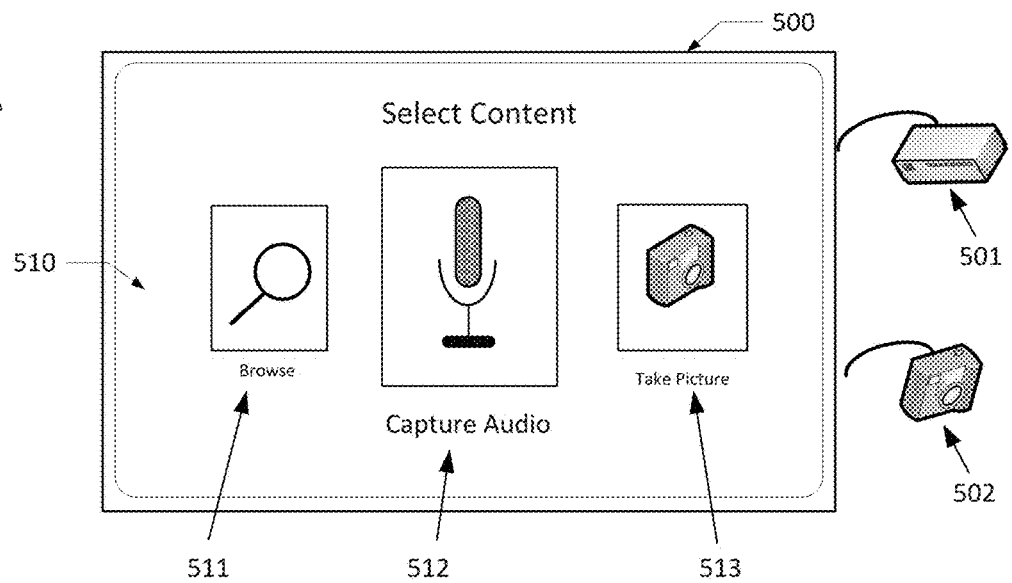
FIG. 5A-B illustrate example user interfaces for selecting content items according to one or more illustrative aspects of the disclosure.
Figure 5B:
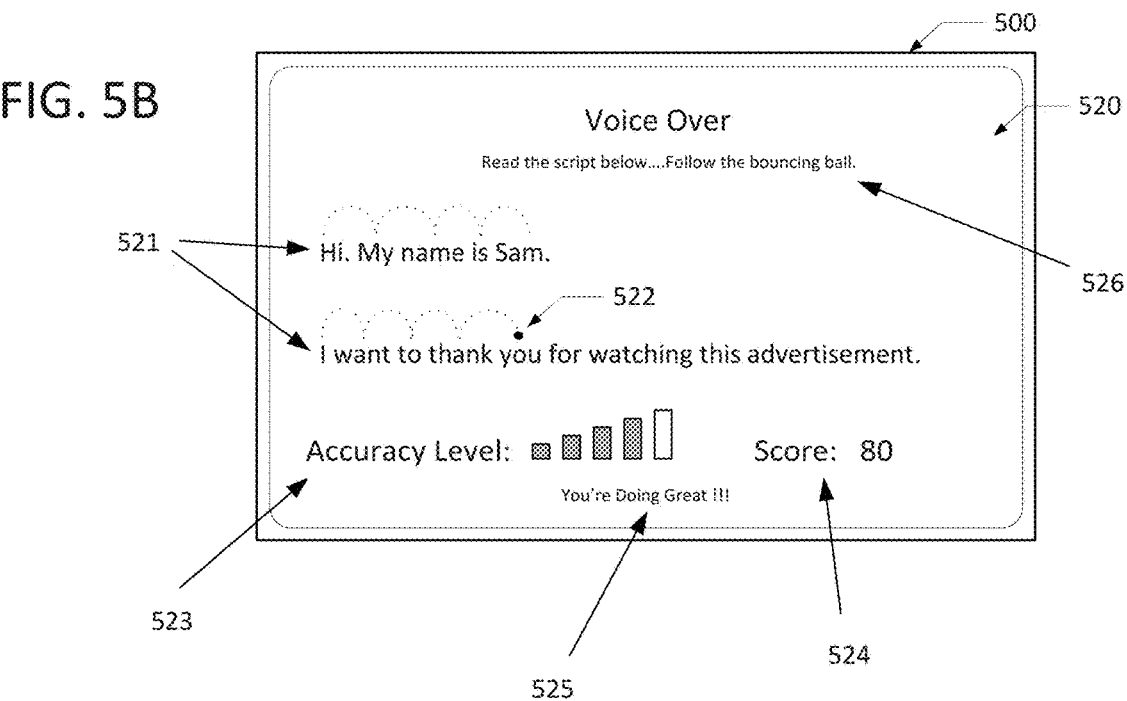

FIGS. 5A-B illustrate example interfaces for selecting and customizing user content in accordance with one or more aspects of the disclosure. As noted above, after identifying or selecting an advertising template to customize, the user may customize the advertisement by adding content items (e.g., audio content, textual content, a static image, digital video content, animated video content, etc.) to the advertising template. A user may retrieve content items from a variety of locations (or devices) without departing from the scope of the present disclosure. For example, a user may retrieve media content from the user's personal computer (e.g., device 114), laptop computer (e.g., device 115), smartphone or other type of wireless device, (e.g., device 116) that may store media content accessible by the user.

FIG. 5A illustrates an example interface (e.g., UI 510) that may be displayed in response to a user selecting an advertising template to customize as described with reference to FIGS. 4A-E. A user may be presented with UI 510 by selecting a "customization" icon or some other portion of a user interface indicating the initiation of the customization process. For example, referring back to FIG. 4E, a tab included within portion 453 of UI 440 may provide the user with an option to customize the advertisement being consumed (e.g., viewed) by the user.

Referring now to FIG. 5A, in this illustrated example, UI 510 may present a variety of options for a user to add content items to an advertising template. Various different types of content items may be added to an advertising template, such as audio content, video content (e.g., digital, animated, etc.), image content (e.g., jpeg., bmp., png., etc.), textual content, and the like. For example, users desiring to add audio content to advertisement may begin customizing the advertising template by selecting a first portion 512 of UI 510 (e.g., "capture audio" icon 512). As another example, users desiring to add a new video (e.g., video content) to an advertisement may begin customizing the advertising template by selecting a "capture video" icon (not shown). As yet another example, users desiring to add a new photo (e.g., image content) to an advertisement may begin customizing the advertising template by selecting a second portion 513 of UI 510 (e.g., "take picture" icon 513). As depicted in FIG. 5A, display 500 may be operatively connected to an image capturing device, such as camera 502. In some embodiments, camera 502 may be integrally formed within display 500. In other embodiments, camera 502 may be operatively connected to computing device 501 (not shown). A user may access additional options for adding content that may not currently be displayed on a screen of UI 510 by performing one or more predetermined physical gestures on display 500 (e.g., swipe left, swipe right, etc.).

As a potential feature, systems, methods, and computer interfaces in accordance with at least some examples of this disclosure may allow users to customize advertising content by adding stored content items to an advertising template. As illustrated by FIG. 5A, a user may browse or search through stored content items, by selecting a third portion 511 of UI 510. In some embodiments, third portion 511 may be represented by a "browse" icon on UI 500. In one of these embodiments, after selecting browse icon 511, a user may browse content items that may have been generated by the user or other users. The content made available to a user via the UI may be stored on a content server, such as server 106, and may include content items from various sources. In some embodiments, computing device 501 may retrieve content items from other websites, software applications, and the like, that may be associated with the user. For example, the UI may prompt the user to provide credentials (e.g., username and/or password) for a particular website, software program, or web-based application so that computing device 501 may access, and subsequently provide the UI with content that may be stored on another content server (e.g., content server maintained by a different entity). As will be discussed in more detail below, once a content item has been selected, the user may be presented with one or more interfaces for integrating or combining the content item with an advertising template.

The advertising template may include a variety of content components, including audio components, visual components, or some combination thereof. In particular, an audio component of an advertising template may encompass a recording of a person reading a script corresponding to and/or associated with the advertisement. In some embodiments, a user may generate audio content for an advertising template by reading the same script, or a different one that is associated with the corresponding advertisement. FIG. 5B illustrates an example user interface 520 that may be displayed in response to a user initiating capture audio icon 512 in UI 510 as described above in conjunction with FIG. 5A. A computing device, such as computing device 501, may be operatively connected to a microphone or other suitable audio capturing device capable of capturing and generating audio data corresponding to the user's voice. In some embodiments, the audio capturing device may be integrally formed within computing device 501. In other embodiments, the audio capturing device may be integrally formed within display 500.

As illustrated in FIG. 5B, a first portion 526 of UI 520 may include textual directions to assist the user with capturing audio for the advertising template. In this example, the textual directions instruct a user to read a script that is associated with the advertising template and that is displayed in a second portion 521 of UI 520. The UI may further assist the user by visually indicating a pace or rhythm for reading the script. The UI may retrieve from memory an audio template or other data indicating the pace or rhythm for reading a particular script. There are a variety of ways in which the UI may visually indicate the pace or rhythm for reading a script. For example, as illustrated by element 522 in FIG. 5B, the UI may use a bouncing ball (or other virtual object) to visually indicate when the user should read each word in the script. As the script is displayed on UI 520, the animated ball may bounce across the top of each word in the script, landing on each word (or syllable) when it is to be spoken by the user. As another example, the UI 520 may visually indicate the pace or rhythm for reading a script by highlighting or modifying the color of each word in the script when it is to be spoken by the user. Computing device 501 may record the user's voice as the user reads the script provided in portion 521 of UI 520.

A script associated with an advertising template may comprise one or more textual portions or segments that may be separately displayed to a user. In some embodiments, as the user reaches the end of a first textual segment provided in portion 521 of UI 520, computing device 501 may begin displaying the next textual segment of the script in UI 520. In other embodiments, the next textual segment of the script may be displayed in a new screen of UI 520 or displayed in a different UI.

As another potential feature, systems, methods, and computer interfaces in accordance with at least some examples of this disclosure may provide the user with an indication of how well he or she is reading the script. There are a variety of ways in which a computing device, such as computing device 501, may indicate how well the user is reading a script. In some embodiments, computing device 501 may comprise a smartphone, tablet, or other type of personal computing device. In one embodiment, computing device 501 may include speech synthesis and/or voice comparison software configured to process and analyze audio data. Computing device 501 may analyze audio data corresponding to a user's voice when speaking one or more segments of a script associated with the advertising template. Computing device 501 may then compare the audio data for the user with audio information associated with the advertising template. The audio information associated with the advertising template may include audio data corresponding to a professional (e.g., celebrity, spokesman, or other suitable persons) speaking the one or more segments of script associated with the advertising template. Computing device 501 may process the audio data for the user to indicate the accuracy of the imitation.

After completing an attempt to read the script, computing device 501 may inform the user how well he or she successfully read the script. For example, as illustrated by element 523, UI 520 may indicate how accurately the user read the script. As another example, as illustrated by element 524, UI 520 may display a performance score indicating how well the user read the script. Accuracy and performance scores may be based on a combination of how similar various textual segments spoken by a user are to the professional's. The computing device may weigh certain segments and/or aspects of the analyzed audio data more highly than others, or may weigh each segment and/or aspect equally. For example, the audio information associated with the professional may provide information on various different metrics and may compare the user's audio data to each of one or more of those metrics. Any suitable audio metric may be utilized by computing device 501 without departing from the scope of this disclosure, such as tone, pitch, rhythm, cadence, etc. Computing device 501 may determine a ratio of the user's performance metric to the professional's metric and may identify an accuracy level or performance score based on whether the ratio is above certain predetermined thresholds corresponding to various levels of accuracy (or performance scores). Accuracy and/or performance scores also may be determined in other manners.

In some embodiments, a user's performance score must exceed a threshold score for the audio recording to be accepted by computing device 501. If the user's performance score exceeds the threshold score (e.g., value), the user may continue to customize the advertising template. However, if the user's performance score does not exceed the threshold score, the UI may prompt the user to re-read the script until a satisfactory score (e.g., a score above the threshold) is obtained. In other embodiments, a user may need to maintain a certain level of accuracy (e.g., accuracy threshold) while reading the script for the audio recording to be accepted by computing device 501. In some embodiments, computing device 501 may dynamically inform the user how well he or she is successfully reading the script. The computing device may dynamically process and analyze data corresponding to a user's voice as the user is reading the script. In one of these embodiments, computing device 501 may dynamically update accuracy object 523 in UI 520 to visually indicate how accurately the user is reading a script in "real-time."

In another of these embodiments, portion 525 of UI 520 may display textual information indicating how well the user is successfully reading the script. Similar to accuracy object 523, a portion 525 of UI 520 may be dynamically updated by computing device 501 to indicate how well the user is reading the script in "real-time." For example, if the user is reading the script poorly (e.g., has a low accuracy level and/or a low performance score), portion 525 of UI 520 may indicate that the user is not successfully reading the script and may display a textual comment to that effect (e.g., "You're not doing a good job"). As another potential feature, portion 525 of UI 520 may be dynamically updated to provide the user with assistance or recommendations for reading the script.

Recommendations may be provided to the user based on information generated by the audio analysis performed by computing device 501. For example, if the user is reading the script too slow, portion 525 of UI 520 may indicate that the user should read the script faster and may display a textual comment to that effect (e.g., "Read Faster!"). As another example, if the user is reading the script too fast, portion 525 of UI 520 may indicate that the user should read the script slower and may display a textual comment to that effect (e.g., "Read Slower!"). As yet another example, if the user is reading the script too softly, portion 525 of UI 520 may indicate that the user should read the script louder and may display a textual comment to that effect (e.g., "Read Louder!"). Various other recommendations or assistance may be provided to the user in accordance with information generated by the audio analysis performed by computing device 501.

In some embodiments, the UI may provide the user with textual or visual directions to assist the user with capturing video content for an advertising template. The textual directions may instruct a user to perform one or more physical movements to be captured by a video recording device. The UI may further assist the user by visually indicating the one or more physical movements that the user must perform. The UI may retrieve from memory a video clip or other data indicating the physical movements to be performed by the user. In some embodiments, the UI may visually indicate the physical movements for a user to perform by generating a display of an avatar that may perform the one or more physical movements required by the advertising template. A video recording device operatively connected to or integrated within computing device 501 may record the user's attempt at performing the one or more physical movements for an advertising template.

As another potential feature, systems, methods, and computer interfaces in accordance with at least some examples of this disclosure may provide the user with an indication of how well he or she is performing (or mimicking) the one or more physical movements required by an advertising template (e.g., performed by the avatar). There are a variety of ways in which a computing device, such as computing device 501, may indicate how well the user is performing the required physical movements. In some embodiments, computing device 501 may comprise a smartphone, tablet, or other type of personal computing device. In one embodiment, computing device 501 may include image recognition software configured to process and analyze video data. Computing device 501 may analyze video data corresponding to a user performing one or more physical movements associated with the advertising template. Computing device 501 may then compare the video data for the user with video information associated with the advertising template. The video information associated with the advertising template may include video data corresponding to a virtual individual (e.g., avatar) performing the one or more physical movements associated with the advertising template. Computing device 501 may process the video data for the user to indicate the accuracy of the imitation.

In some embodiments, computing device 501 may inform the user how well he or she successfully performed the physical movements. For example, the UI may display a performance score indicating how well the user performed the physical movements. Accuracy and performance scores may be based on how accurately a user mimics an avatar associated with the advertising template. In some embodiments, a user's performance score must exceed a threshold score for the video recording to be accepted by computing device 501. If the user's performance score exceeds the threshold score (e.g., value), the user may continue to customize the advertising template. However, if the user's performance score does not exceed the threshold score, the UI may prompt the user to re-record the performance of the physical movements until a satisfactory score (e.g., a score above the threshold) is obtained. In some embodiments, computing device 501 may dynamically inform the user how well he or she is performing the physical movements.

In another embodiment, the UI may display textual information indicating how well the user is successfully performing the physical movements associated with an advertising template. For example, if the user is performing the physical movements poorly (e.g., has a low accuracy level and/or a low performance score), the UI may indicate that the user is not successfully performing the physical movements and may display a textual comment to that effect (e.g., "You're not doing a good job"). As another potential feature, the UI may be dynamically updated to provide the user with assistance or recommendations for performing the physical movements. Recommendations may be provided to the user based on information generated by the video analysis performed by computing device 501.

Figure 6A:
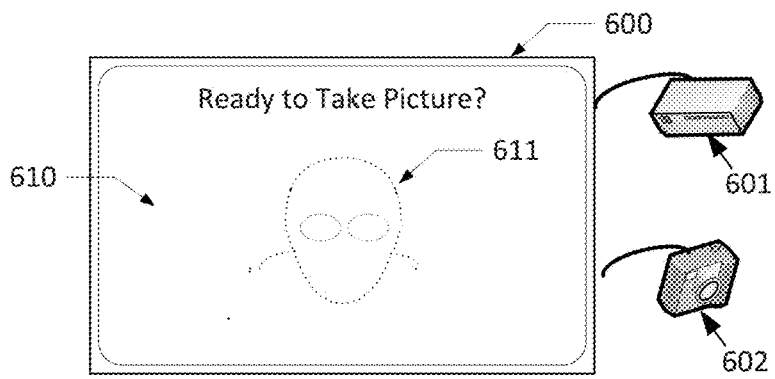
FIG. 6A-C illustrate example user interfaces for selecting content items according to one or more illustrative aspects of the disclosure.
Figure 6B:
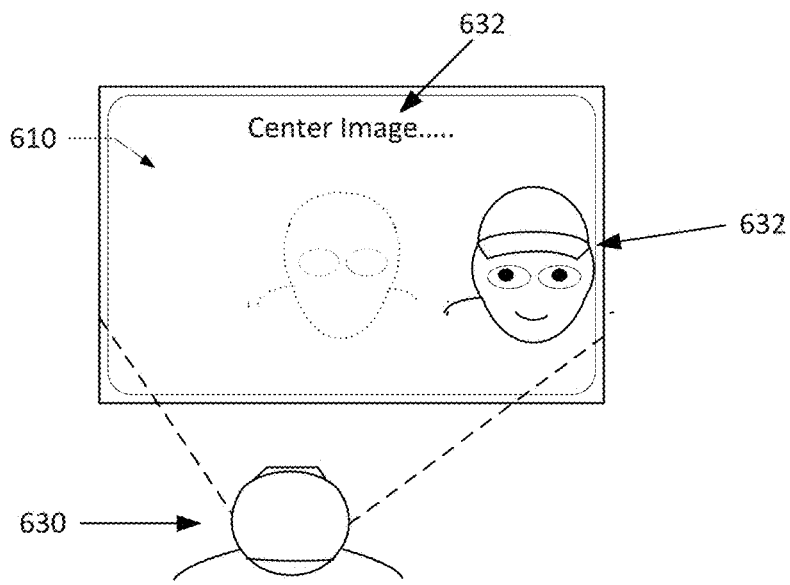
Figure 6C:
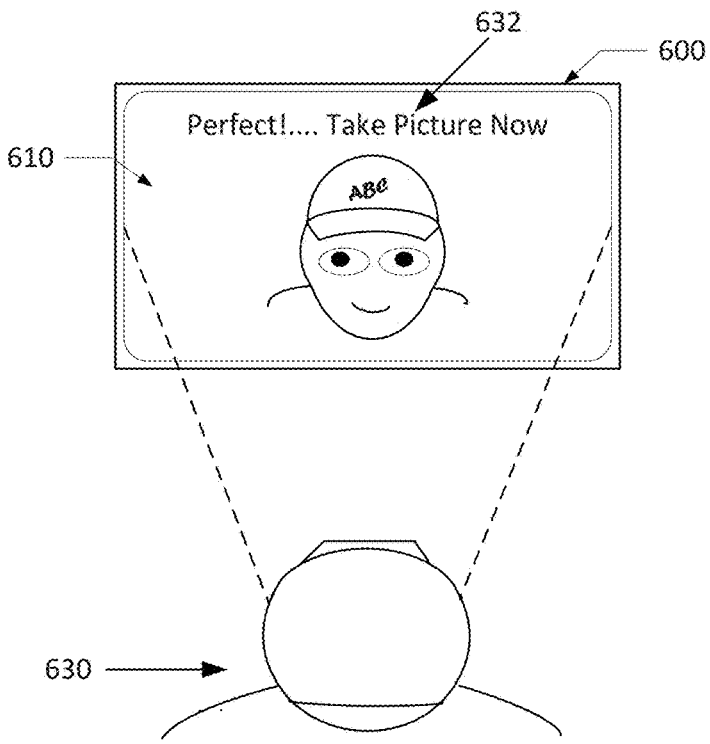

FIGS. 6A-C illustrate example interfaces for selecting and customizing user content in accordance with one or more aspects of the disclosure. The example above discussed a user replacing the audio portion of an advertisement with a recording of the user reading the same (or other related) script of dialogue for the advertisement, and this degree of customization may make the advertisement more enjoyable for members of the user's household and/or circle of friends. In some embodiments, the user can replace portions of the video as well. For example, the user can replace static images in advertising content with static photos from the user's own smartphone, computer, or other device. FIG. 6A illustrates an example interface (e.g., UI 610) that may be displayed in response to a user selecting a take picture icon 513 as described above in conjunction with FIG. 5A.

In some embodiments, a user may generate image content to be added to an advertising content by taking a photo using an image capturing device, such as camera 602. As will be appreciated, camera 602 may be integrated within computing device 601 (e.g., the user's smartphone, computer or other computing device). As illustrated in FIG. 6A, UI 610 may provide form outline 611 to assist the user with taking an appropriate photo for the advertising template. In this illustrated example, the UI may prompt the user to mimic form outline 611 when taking a picture with camera 602. Form outline 611 may be generated on the UI in accordance with one or more restrictions associated with an advertising template, as described above. In some embodiments, the UI may prompt the user to take one or more pictures with various facial expressions or emotions. For example, the UI may prompt the user to take a picture wherein the user is smiling, frowning, confused, etc. . . . . Computing device 601 may utilize image content corresponding to the one or more pictures of the user having various facial expressions or expressing various emotions to generate the customized advertising content.

FIG. 6B illustrates an example screen of UI 610 displaying an image of user 630 (i.e., image 631) that is generated by camera 602. As depicted by element 632, UI 610 may provide the user with assistance or recommendations for taking an appropriate picture. For example, as illustrated in FIG. 6B, computing device 601 may instruct the user to center image 631 on UI 610. The user may center image 631 by adjusting the position of camera 602, or by changing his or her location with respect to camera 602. After the user has successfully mimicked form outline 611, as illustrated in FIG. 6C, UI 610 may prompt the user to take the picture. After a picture is captured (e.g., image content is generated), computing device 601 may store in memory data relating to the captured image. The user may subsequently access the stored image content via the UI (e.g., UI 510).

As discussed above, advertising templates may include content limitations or restrictions relating to the various types of content items that may be added to the template. In some embodiments, advertising templates may include additional requirements or restrictions based on certain aspects of the content item being added. As an example, with respect to image content, some advertising template requirements may relate to certain threshold image characteristics, such as data file size, image resolution, number of pixels, image dimensions, and the like. For instance, an advertising template may require that only photos having a data file size less than 1 MB may be added to the template. As another instance, an advertising template may require that the photo being added to the template must be of a certain dimension (e.g., length, height, etc.), such that the photo may be inserted into the advertising template to create a visually appealing/suitable advertisement.

Other template requirements may include the size of the user in the image, the position and/or posture of the user in the image, and other limitations relating to the position and/or size of the user as depicted by the image content. In some embodiments, the UI may utilize an image recognition application or software program to determine and/or confirm whether image content is appropriate or acceptable in accordance with the one or more restrictions, parameters, or requirements associated with an advertising template. For instance, an advertising template may require that image content added to the template corresponds to an image of a person in a particular pose (e.g., standing up, sitting down, waving, etc.), so that the added image content may visually blend with the advertising template. The UI may process (via the image recognition application) image content selected by the user to determine whether the content corresponds to the particular pose required by the template. Thus, in some embodiments, computing device 501 may only accept (e.g., permit to be added to the template) images of individuals in the requisite pose. As another example, with respect to image content, some advertising template requirements may also include the file size of the image content, the quality (e.g., resolution) of the image content, and the like.

Figure 7A:
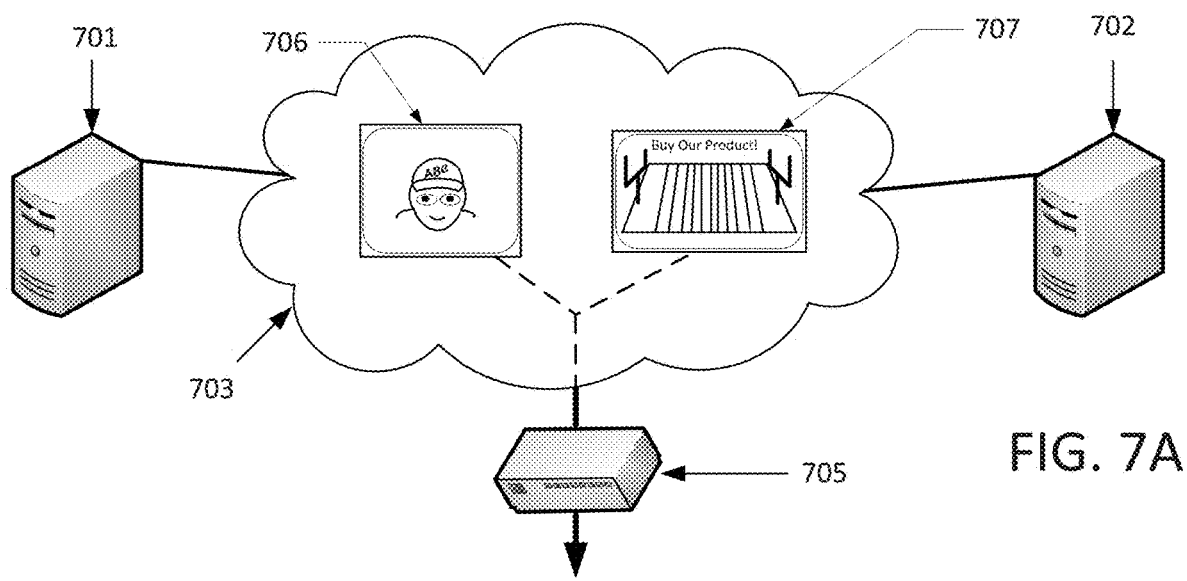
FIG. 7A illustrates an example flow for generating custom advertising content according to one or more illustrative aspects of the disclosure

FIG. 7A illustrates an example flow for merging an advertising template and content items in accordance with one or more aspects of the disclosure. As discussed above, a user may generate a customized advertisement by merging (e.g., integrating) content items with an advertising template. As illustrated by FIG. 7a, computing device 705 may communicate with content server 701 to retrieve stored content items as described above with reference to FIGS. 5A and 6A-C. In particular, computing device 705 may request data corresponding to particular content items, such as image content 706, from content server 701. Computing device 705 may request from content server 701 one or more items of content stored at server 701. In this illustrated example, image content 706 may comprise the image captured and stored using UI 610 as described above with reference to FIG. 6C.

As illustrated in FIG. 7A, computing device 705 may access advertising server 701, via network 703, to retrieve an advertising template as described above with reference to FIGS. 4A-C. In particular, computing device 705 may request data corresponding to advertising template 707 from advertising server 702. Computing device 705 may request from advertising server 702 one or more advertising templates stored at server 702. In this illustrated example, advertising template 707 may comprise the template selected by the user via UI 430 as described above with reference to FIG. 4C. After retrieving the desired content items and advertising template from content server 701 and advertising server 702, respectively, computing device 705 may merge the retrieved content and advertising template to generate customized advertising.

Figure 7B:
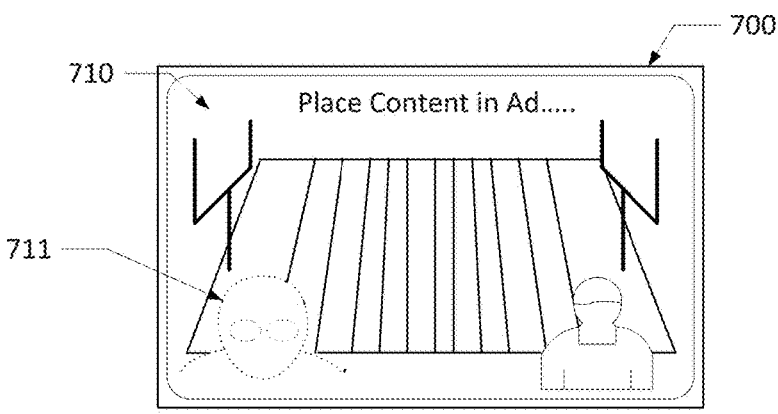
FIGS. 7B-C illustrate example interfaces for customizing and experiencing an advertisement according to one or more illustrative aspects of the disclosure
Figure 7C:
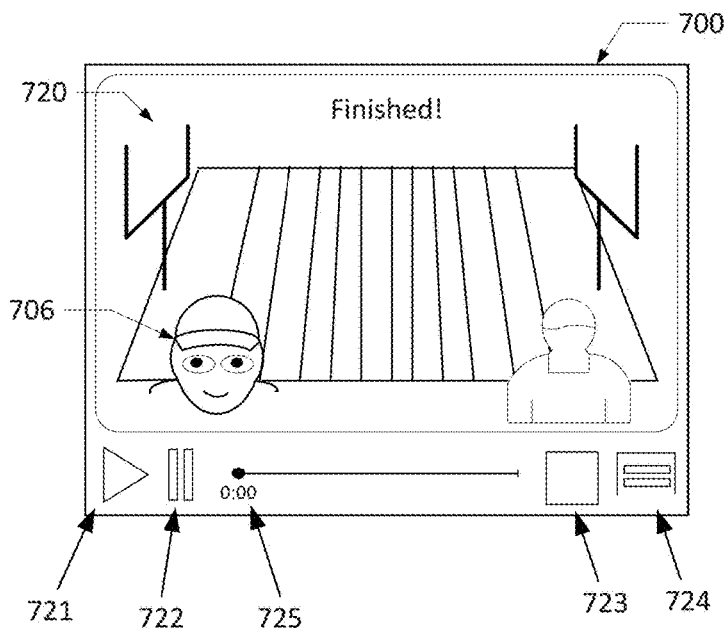

There are a variety of ways in which computing device 705 may merge content items and an advertising template to generate a customized advertisement. As depicted by FIG. 7B, a user interface, such as UI 710, may be configured to add content selected by the user (e.g., image content 706) to an advertising template selected by the user (e.g., advertising template 707). In this illustrated example, UI 710 displays placeholder image 711 that corresponds to image content 706, and that is to be placed within the selected advertising template. The user may move image 711 to a desired location within UI 710. As the user is placing the image, the rules and restrictions may be dynamically applied to indicate when the user has sized and placed the image in a way that complies with the rules and restrictions for the template. After image 710 has been moved to a desired location, the user may then finalize the location of image content 706 within the advertising template. There are a variety of ways to finalize the location of image content placed within an advertising template. For example, computing device 705 may display a message in display 700 prompting the user to confirm the final image location. As another example, the user may access a UI menu (e.g., via icon 724) that provides an option for a user to finalize an image location. After the location of image content within an advertising template has been finalized, computing device 705 may merge (e.g., integrate) the image content with the advertising template to generate a customized advertisement, as depicted in FIG. 7C.

After the customized advertisement is generated, the content may be made available for user consumption via UI 720. FIG. 7C illustrates an example of a user interface (e.g., UI 720), that may be provided for the user to experience (e.g., consume) the customized advertisement. As depicted in FIG. 7C, UI 720 may provide the user with a series of icons that provide operational functions to experience (e.g., consume) the customized advertisement. For example, play icon 721 may permit the user to begin playing the customized advertisement; pause icon 722 may permit the user to pause advertisement; and stop icon 443 in UI 440 may permit the user to stop the advertisement. A variety of other operational controls may be provided to the user via UI 720 (e.g., fast-forward, rewind, etc.). A portion 725 of UI 440 may indicate various informational details relating to the advertising template, such as the name of the advertisement, the length of the advertisement, the playing time for the advertisement, the amount of time left in the advertisement, and the like.

A portion 724 (e.g., menu icon 724) of UI 720 may present the user with a menu to change or adjust various settings and/or features associated with the customized advertisement. Menu icon 724 may include similar features and functionality as menu icon 444 described with reference to FIGS. 4D-G. In one embodiment, in response to the user initiating menu icon 724, UI 720 may display a menu listing a variety of options available to the user for modifying and/or interacting with the customized advertisement. For example, the UI menu may provide the user with an option to store the customized advertisement in memory. As another example, the UI menu may provide the user with an option to further edit or modify the customized advertisement. As yet another example, the UI menu may permit a user to review the customized advertising and identify one or more customizable elements associated with the advertising content that the user may wish to modify.

Figure 8A:
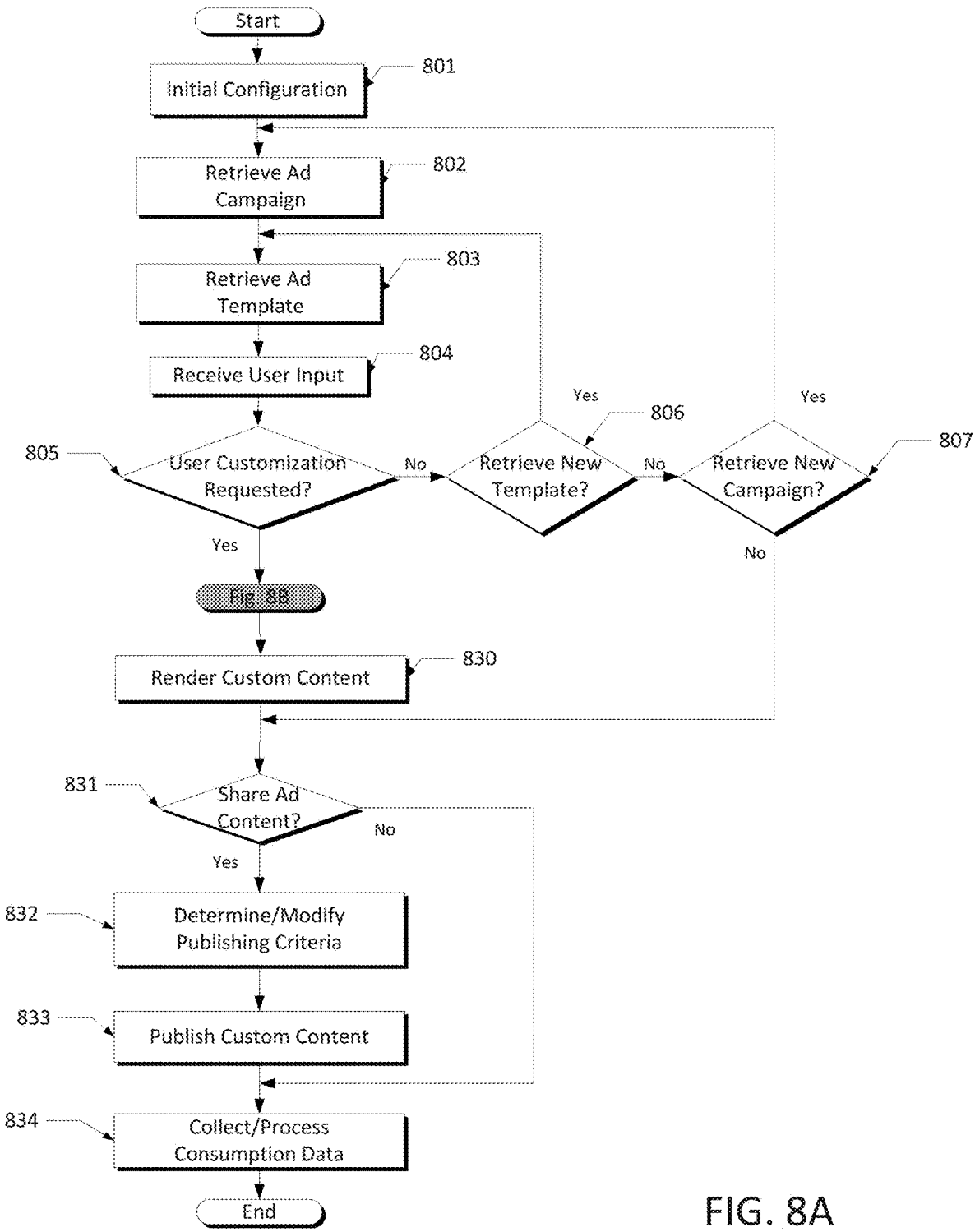
FIGS. 8A-B illustrate exemplary flowcharts of a method in accordance with one or more aspects of the disclosure.
Figure 8B:
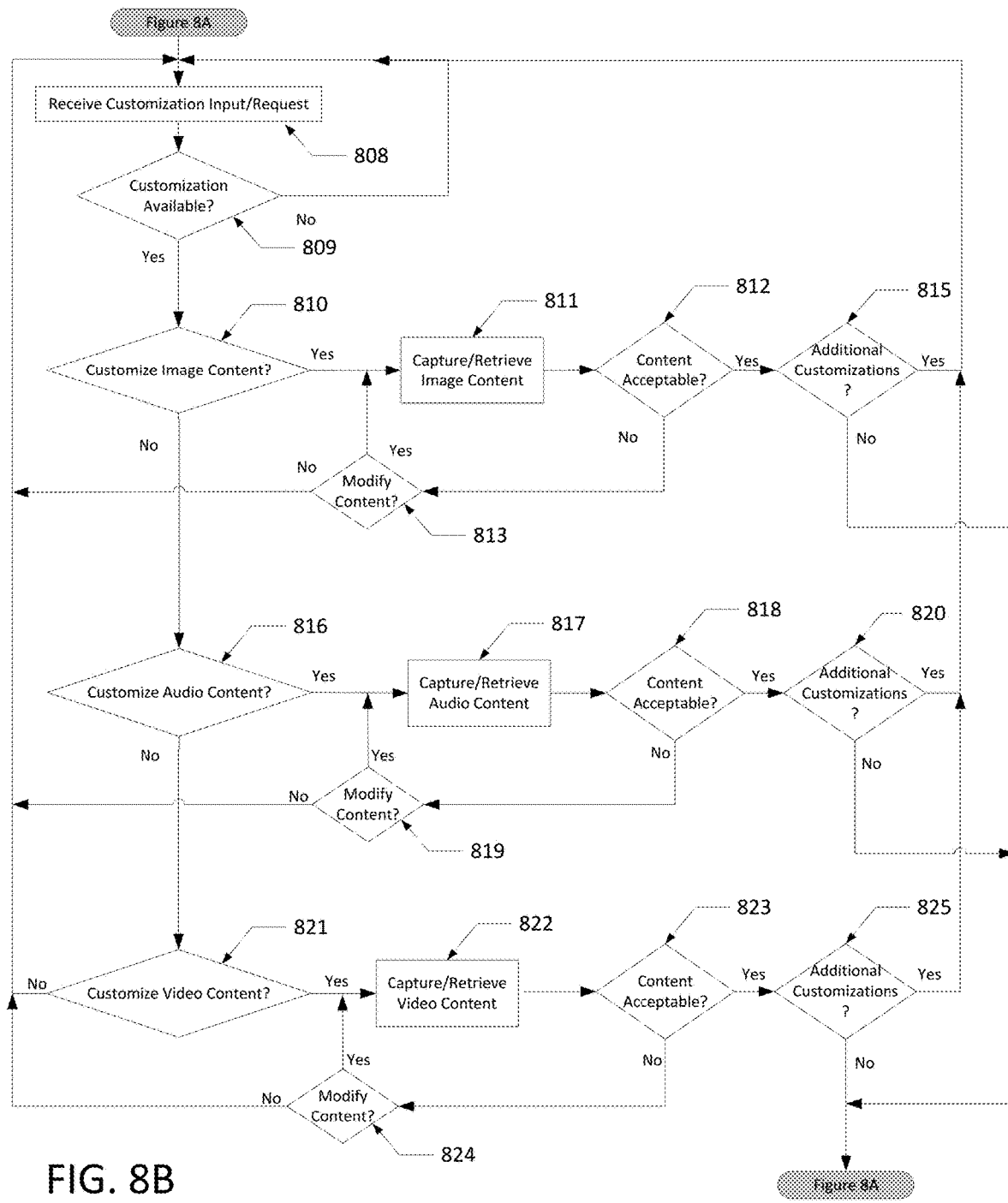

FIGS. 8A-B illustrate an example method of customizing an advertisement with user content according to one embodiment of the disclosure that may be performed by one or more computing devices, such as computing device 705 or any other suitable computing device. When describing the steps of the method below, the term "system" may be used when referring to each component, either singularly or collectively, employed at each step of the method. Such usage is merely for ease in discussing the method, and should not be interpreted as limiting the exact embodiment in which the following method may be performed.

Referring to FIG. 8A, at step 801 an initial configuration of the system may be performed such as user registration, identifying user advertising preferences, or loading previously saved user profile information and other associated data. Other system configuration may also include calibration of an image capturing device, such as a camera, that is operatively connected to or integrated within the system, establishing default advertising campaign preferences, personal content filters, parental control preferences, or other user preferences. For example, during step 801, the system may receive input from a user establishing default preferences associated with the user's profile. In this example, the user may create or adjust parental control preferences or personal content filters that may limit the types and/or categories of advertising content and content items that may be accessed by and/or displayed on a user interface. As another example, during step 801, the system may receive input from a user establishing or adjusting various advertising campaign preferences for advertising content that has been generated or customized by the user or other users.

In step 802, the system may retrieve an advertising campaign and associated data. In some embodiments, the system may retrieve an advertising campaign and associated data in response to receiving user input corresponding to a request to retrieve an advertising campaign or related data. In one embodiment, the system may retrieve from an advertising server, such as server 702, an advertising campaign in response to receiving user input corresponding to a request to retrieve an advertising campaign. During step 802, the user may browse through one or more advertising campaign when identifying a particular advertising campaign for the system to retrieve. In another embodiment, the system may also retrieve data and other information associated with a requested advertising campaign. For example, the system may retrieve publishing preferences and criteria for advertising content associated with a requested advertising campaign. In other embodiments, the system may retrieve from memory a previously created advertising campaign. In some embodiments, during step 802, the system may generate a new advertising campaign. The system may also receive user input specifying one or more characteristics, parameters, or preferences for the new advertising campaign.

In step 803, the system may retrieve an advertising template and associated data. In some embodiments, the system may retrieve the advertising template and associated data in response to receiving user input corresponding to a request to retrieve an advertising template. Additionally, the system may retrieve an advertising template in response to receiving user input, via a user interface, requesting a particular advertising template. During step 803, the user may browse through one or more advertising templates when identifying a particular advertising template for the system to retrieve. The system may also retrieve various types of other data or information associated with the advertising template requested by the user. For example, the system may retrieve data specifying one or more customization parameters associated with an advertising template. For instance, the system may retrieve a textual script and/or an audio template associated with a particular audio customization and/or advertising template; the system may retrieve data identifying the various customizable elements for an advertising template; the system may retrieve data identifying information associated with each customizable element of an advertising template, such as the various locations in an advertising template where certain media content may be inserted or modified, a requisite length (e.g. playing time) for media content, and the like.

As another example, the system may retrieve data identifying a genre or category of subject matter associated with the advertising template. As yet another example, the system may retrieve data identifying a genre or subject matter category associated with the advertising template. As still another example, the system may retrieve data corresponding to various details or characteristics of the advertising template, such as the title of the advertising template, when the advertising template was last modified, the length of the advertisement, an associated file path or location for the advertisement, and the like. In other embodiments, the system may retrieve the advertising template from an advertising server, such as server 702. In other embodiments, the system may request an advertising template from a server, such as server 702, in accordance with a user selection of an advertising template via a user interface, such as UI 430. During step 803, the system may store in memory data relating to the retrieved advertising template. In some embodiments, the system may process data relating to the retrieved advertising template in order to identify user advertising preferences and/or to modify user preferences based on the selected advertising template and/or the user's previous content consumption behavior.

After retrieving the advertising template, the method may proceed to step 804, where the system may receive and process input from the user. In some embodiments, the system may receive and process input information transmitted from an input device utilized by the user to navigate a user interface. During step 804, the user may consume (or experience) the advertising content associated with the advertising template retrieved during step 803. In some embodiments, the system may receive user input corresponding to one or more instructions or requests made by the user. For example, the system may receive user input corresponding to a request to customize the advertising template retrieved during step 803. As another example, the system may receive user input corresponding to a request to retrieve a new advertising template. As still another example, the system may receive user input corresponding to a request to retrieve a new advertising campaign.

At step 805, the system may determine whether the user has requested to customize the advertising template retrieved during step 803. There are a variety of ways in which the system may determine whether the user has requested to customize an advertising template. In some embodiments, the system may process user input received via a user interface to determine whether a user wishes to customize an advertising template. As one example, the system may process user input received during step 804 to determine whether a user wishes to customize an advertising template. If the system determines that a user has requested to customize the advertising template retrieved during step 803, the method may proceed to step 808, where the system may receive input corresponding to one or more customizations or customizations requests for the advertising template.

If the system determines that a user has not requested to customize the advertising template retrieved during step 803, the method may proceed to step 806, where the system may determine whether the user has requested a new advertising template. There are a variety of ways in which the system may determine whether the user has requested a new advertising template. In some embodiments, the system may process user input received via a user interface to determine whether the user wishes to retrieve a new advertising template, e.g., an advertising template that is different than the template retrieved during step 803. For example, the system may process user input received during step 804 to determine whether the user wishes to retrieve a new advertising template.

At step 806, if the system determines that a user has requested a new advertising template, the method may proceed back to step 803, where the system may retrieve a new advertising template selected by the user. If the system determines that a user has not requested a new advertising template, the method may proceed to step 807, where the system may determine whether the user has requested a new advertising campaign. There are a variety of ways in which the system may determine whether the user has requested a new advertising campaign. In some embodiments, the system may process user input received via a user interface to determine whether the user wishes to retrieve a new advertising campaign, e.g., an advertising campaign that is different than the campaign retrieved during step 802. As one example, the system may process user input received during step 804 to determine whether the user wishes to retrieve a new advertising campaign. At step 807, if the system determines that a user has requested a new advertising campaign, the method may proceed back to step 802, where the system may retrieve a new advertising campaign selected by the user. If the system determines that a user has not requested a new advertising template, the method may proceed to step 831.

Referring now to FIG. 8B, at step 808, the system may receive data specifying one or more customization inputs and/or customization requests for an advertising template. In some embodiments, the system may receive customization input via a user interface. The user interface may provide the user with one or more interface screens, options, and/or tools for customizing an advertising template. There are a variety ways in which a user may customize the advertising template. For example, the system may receive input corresponding to the addition (or removal) of media content (e.g., audio content video content, image content, etc.) to/from an advertising template in accordance with predetermined parameters or limitations associated with the advertising template. The system may also receive input corresponding to a user request to add media content to an advertising template. Such requests may be transmitted to the system upon the user selecting one or more corresponding menus, icons, or other interface elements configured to permit a user to add media content to an advertising template. As another example, the system may receive input corresponding to the modification of or request to modify one or more customizable element associated with an advertising template. For instance, the user may utilize an input device to modify the location of image content (e.g., a photo) within an advertising template. In some embodiments, during step 808, the system may receive input corresponding to a user request to generate media content (e.g., video content, audio content, image content, etc.) that may be added to an advertising template.

At step 809, the system may determine whether the one or more customizations requested by a user are available and/or may be accessed by the user. In some embodiments, the system may determine whether a requested customization is available and/or may be accessed by the user based on the customization input data received during step 808. In other embodiments, the system may process data associated with the advertising template to determine whether a particular customization requested by the user is available or may be performed. Users may attempt to perform one or more customizations that are not supported by an advertising template and/or available via the user interface. For example, the user may attempt to customize an advertising template by inserting video content into the template. However, after analyzing data associated with the advertising template, the system may determine that the advertising template is not configured to accept the video content.

As another example, the user may attempt to customize an advertising template by inserting image content into the template. While the advertising template may be configured to accept image content in certain locations and/or at certain time segments in the advertising content (e.g., video advertisement), in some instances, the user may attempt to include image content in a location and/or at a time segment that is not permitted and/or available. The system may process input data associated with the user customization request to determine whether the customization is available or may be performed. As yet another example, the user may attempt to perform one or more customizations that the user does not have access to. Particular customization tools and options may be inaccessible or "locked" prior to a user completing certain activities, tasks, and/or challenges. For instance, in order to perform a particular customization, such as adding a digital filter to image content (e.g., a photo), the user may be required to consume a threshold level of advertising content to unlock this particular customization tool. They system may determine whether the user has consumed the requisite amount of advertising content before making this customization option available to the user via the user interface.

At step 809, if the system determines that a customization requested by the user is not available or may not be performed, the method may proceed back to step 808 where the system may wait to receive customization input. In some embodiments, if the system determines that a customization requested by the user is not available or may not be performed, the system may transmit a message to the user indicating that the customization cannot be performed. In one of these embodiments, the system may provide the user with detailed information regarding the one or more reasons why the particular customization is not available and/or cannot be performed.

If the system determines that a customization requested by the user is available, the method may proceed to step 810, where the system may determine whether the customization requested by the user corresponds to a request to customize image content relating to an advertising template. During step 810, the system may process input data associated with the user customization request to determine whether the data corresponds to a user request to customize (e.g., insert, replace, modify, remove, etc.) image content in accordance with the advertising template retrieved during step 803. For example, the system may process customization input data received during step 808 to determine whether the customization requested by the user corresponds to a request to customize image content.

At step 810, if the system determines that a customization requested by the user corresponds to a request to customize image content, the method may proceed to step 811. If the system determines that a customization requested by the user does not correspond to a request to customize image content, the method may proceed to step 816, where the system may determine whether the customization requested by the user corresponds to a request to customize audio content relating to an advertising template. During step 816, the system may process input data associated with the user customization request to determine whether the data corresponds to a user request to customize (e.g., insert, replace, modify, remove, etc.) audio content in accordance with the advertising template retrieved during step 803. For example, the system may process customization input data received during step 808 to determine whether the customization requested by the user corresponds to a request to customize audio content.

At step 816, if the system determines that a customization requested by the user corresponds to a request to customize audio content, the method may proceed to step 817. If the system determines that a customization requested by the user does not correspond to a request to customize audio content, the method may proceed to step 821, where the system may determine whether the customization requested by the user corresponds to a request to customize video content relating to an advertising template. During step 821, the system may process input data associated with the user customization request to determine whether the data corresponds to a user request to customize (e.g., insert, replace, modify, remove, etc.) video content in accordance with the advertising template retrieved during step 803. For example, the system may process customization input data received during step 808 to determine whether the customization requested by the user corresponds to a request to customize video content.

At step 821, if the system determines that a customization requested by the user corresponds to a request to customize video content, the method may proceed to step 822. If the system determines that a customization requested by the user does not correspond to a request to customize image content, the method may proceed back to step 808, where the system may receive data specifying customization inputs and/or customization requests for an advertising template.

At step 811, the system may capture and/or retrieve image content in accordance with a user customization request. In some embodiments, the system may process data received during step 808 to determine what image content should be retrieved or captured. For example, if the user wishes to customize an advertising template by adding image content (e.g., a photo) to the template, the system may process data relating to the user's customization request in order to identify the particular image content to add to the advertising template. As another example, if the user wishes to customize an advertising template by modifying, replacing, or removing image content already in the template, the system may process data relating to the user's customization request in order to identify the image content that the user wishes to customize. For instance, the system may process data from an input device indicating the particular image content in the advertising template that the user wishes to customize (e.g., modify, replace, remove, etc.).

In one embodiment, the system may retrieve the identified image content from memory. In another embodiment, the system may retrieve the identified image content from a computing device associated with the user, such as a smartphone, tablet, computer, laptop, or other computing device. In other embodiments, during step 811, the system may determine whether the user wishes to generate new image content (e.g., photo). The system may process customization input data (e.g., input data received during step 808) to determine whether the user wishes to generate new image content for the advertising template. The system may provide the user with an interface for capturing image content via an image capturing device (e.g., a camera). In another embodiment, the system may receive and/or process input data corresponding to one or more user modifications to the image content retrieved during step 811. For example, the system may process input data corresponding to one or more customizations or modifications made to image content in response to a determination that image content within the advertising template is unacceptable.

At step 812, the system may determine whether the image content retrieved and/or captured during step 811 is acceptable. There are a variety of ways in which the system may determine whether retrieved and/or captured image content is acceptable (e.g., compatible/suitable) for the advertising template. In some embodiments, the system may process parental control preferences associated with the user (or a user profile) to determine whether the retrieved content is acceptable. Additionally, or alternatively, the parental control preferences may control which users (or user accounts) have access to particular content. In other embodiments, the system may determine whether the retrieved and/or captured image content satisfies predetermined standards, parameters, restrictions and/or thresholds associated with the advertising template retrieved during step 803. The system may process data associated with the advertising template to determine any corresponding standards, parameters, restrictions and/or thresholds for that advertising template.

In one of these embodiments, the system may determine whether image content retrieved during step 811 meets or exceeds predetermined quality standards (or thresholds) for an advertising template. For example, an advertising template may require that image content added to the template must exceed a threshold level of image resolution. As another example, an advertising template may require that image content added to the template must not exceed a certain file size. As yet another example, an advertising template may require that image content added to the template must correspond to an image of a user in a certain pose, position, or posture. In another of these embodiments, the system may determine whether image content retrieved during step 811 is compatible and/or suitable for the advertising template. For example, the system may determine that an image of a user's face is not compatible with an advertising template that requires an image of the user's entire body.

At step 812, if the system determines that image content retrieved and/or captured during step 811 is acceptable, the method may proceed to step 815. If the system determines that image content retrieved and/or captured during step 811 is not acceptable, the method may proceed to step 813, where the system may determine whether the user wishes to modify the image content retrieved during step 811. During step 813, the system may transmit a message to the user to modify the retrieved image content such that it may be accepted by the advertising template. The system may include in the message one or more reasons why the image content was not accepted. The system may also transmit a message to the user including one or more recommendations for modifying the image content such that it may be accepted by the advertising template. For example, if the retrieved image content (e.g., a photo) has a data file size that is too large (i.e. larger than the size required by the advertising template), the system may transmit a message to the user that the data file size is too large and that the user should modify the image content. In this example, the system may transmit a message to the user to reduce the data file size of the retrieved image content such that it may be accepted by the advertising template. In some embodiments, the system may receive user input indicating that the user wishes to modify the image content retrieved during step 811. For example, the system may receive data from an input device indicating that the user has attempted to modify the image content such that it may be accepted by the advertising template.

At step 813, if the system determines that the user does not wish to modify the image content retrieved during step 811, the method may proceed back to step 808, where the system may wait to receive further customization input. In some embodiments, the system may transmit a message requesting that the user provide further customization input. For example, if the user does not wish to modify image content such that it is accepted by the advertising template, the system may transmit a message to the user indicating that the user must select new or different image content. If the system determines that the user wishes to modify the image content retrieved during step 811, the method may proceed to back to step 811, where the system may capture or receive image content in accordance with the user's customization request.

At step 815, the system may determine whether the user wishes to further customize the advertising template. During step 815, the system may process input data to determine whether the user is attempting to add further customizations to the advertising template. In some embodiments, the system may transmit a message to the user requesting whether the user wishes to further customize the advertising template. The system may determine that the user wishes to further customize the advertising template if the system receives input data indicating that the user wishes to further customize the advertising template. In other embodiments, the system may determine that the user wishes to further customize the advertising template if the system receives input data indicating that the user has attempted to add further customizations to the advertising template via the user interface. If the system determines that the user wishes to further customize the advertising template, the method may proceed back to step 808, where the system may wait to receive further customization input. If the system determines that the user does not wish to further customize the advertising template, the method may proceed to step 830.

At step 817, the system may capture and/or retrieve audio content in accordance with a user customization request. In some embodiments, the system may process data received during step 808 to determine what audio content should be retrieved or captured. For example, if the user wishes to customize an advertising template by adding audio content (e.g., an audio data file) to the template, the system may process data relating to the user's customization request in order to identify the particular audio content to add to the advertising template. As another example, if the user wishes to customize an advertising template by modifying, replacing, or removing audio content already in the template, the system may process data relating to the user's customization request in order to identify the audio content that the user wishes to customize. For instance, the system may process data from an input device indicating the particular audio content in the advertising template that the user wishes to customize (e.g., modify, replace, remove, etc.).

In one embodiment, the system may retrieve the identified audio content from memory. In another embodiment, the system may retrieve the identified audio content from a computing device associated with the user, such as a smartphone, tablet, computer, laptop, or other computing device. In other embodiments, during step 817, the system may determine whether the user wishes to generate new audio content to add to the advertising template. The system may process customization input data (e.g., input data received during step 808) to determine whether the user wishes to generate audio content for the advertising template. The system may provide the user with an interface for capturing audio content via an audio capturing device (e.g., a microphone). In some embodiments, the system may provide the user with a textual script to read when capturing the audio content. The system may retrieve the textual script from data relating to and/or associated with the advertising template. For example, the system may retrieve the textual script from a data file stored along with the advertising template that was retrieved during step 803.

In some embodiments, during step 817, the system may provide feedback to the user regarding whether captured audio content meets or exceeds threshold performance scores and/or accuracy levels associated with the advertising template. The system may display one or more visual images and/or icons on the user interface to dynamically indicate how accurately a user is reading a textual script associated with an advertising template. In other embodiments, the system may display a message, via the user interface, indicating how accurately a user is reading a textual script associated with an advertising template. In another embodiment, the system may display a message, via the user interface, providing the user with one or more suggestions and/or recommendations for providing more accurate audio content. For example, if the system detects that the user is reading the script too slowly, the system may indicate that the user should read the script faster and may display a textual comment or message to that effect (e.g., "Read Faster!").

At step 818, the system may determine whether the audio content retrieved and/or captured during step 817 is acceptable. There are a variety of ways in which the system may determine whether retrieved and/or captured audio content is acceptable (e.g., compatible/suitable) for the advertising template. In some embodiments, the system may process parental control preferences associated with the user (or a user profile) to determine whether the retrieved content is acceptable. In other embodiments, the system may determine whether the retrieved and/or captured audio content satisfies predetermined standards, parameters, restrictions and/or thresholds associated with the advertising template retrieved during step 803. The system may process data associated with the advertising template to determine any corresponding standards, parameters, restrictions and/or thresholds for that advertising template.

In one of these embodiments, the system may determine whether audio content retrieved during step 817 meets or exceeds predetermined quality standards for an advertising template. For example, an advertising template may require that audio content added to the template must exceed a threshold level of volume. As another example, an advertising template may require that audio content added to the template must not exceed a certain file size. As yet another example, an advertising template may require that audio content added to the advertising template must not exceed a certain length (e.g., playing time). For instance, the system may not accept audio content having a length (e.g., playing time) that exceeds the length of audio content required by the advertising template.

In another of these embodiments, the system may determine whether audio content retrieved during step 817 is compatible and/or suitable for the advertising template. For example, an advertising template may require that audio content added to the template must correspond to a textual script associated with the advertising template. The system may process audio content captured during step 817 to determine whether the audio content meets or exceeds a threshold level of accuracy in accordance with a reading of the textual script associated with the advertising template. In other embodiments, the system may process audio content captured during step 817 to determine whether the audio content meets or exceeds a threshold performance score associated with the advertising template.

As another example, an advertising template may require that audio content added to the template must sufficiently correspond to audio information associated with the advertising template. The audio information associated with the advertising template may include audio data corresponding to a professional (e.g., celebrity, spokesman, or other suitable persons) speaking one or more segments of a textual script associated with the advertising template. The system may process audio content captured during step 817 and compare the audio content to audio information associated with the advertising template to determine whether the audio content meets or exceeds a threshold level of accuracy for the advertising template. In other embodiments, the system may process audio content captured during step 817 and compare the audio content to audio information associated with the advertising template to determine whether the audio content meets or exceeds a threshold performance score associated with the advertising template.

At step 818, if the system determines that audio content retrieved and/or captured during step 817 is acceptable, the method may proceed to step 820. If the system determines that audio content retrieved and/or captured during step 817 is not acceptable, the method may proceed to step 819, where the system may determine whether the user wants to modify the audio content captured and/or retrieved during step 817. During step 819, the system may transmit a message to the user to modify the captured and/or retrieved audio content such that it may be accepted by the advertising template. The system may include in the message one or more reasons why the audio content was not accepted. The system may also transmit a message to the user including one or more recommendations for modifying the audio content such that it may be accepted by the advertising template.

For example, if the captured and/or retrieved audio content has a data file size that is too large (i.e. larger than the size required by the advertising template), the system may transmit a message to the user that the data file size is too large and that the user should modify the audio content. In some embodiments, the system may receive user input indicating that they user wishes to modify the audio content retrieved during step 817. In other embodiments, the system may receive input data indicating that the user wishes to attempt to capture (e.g., re-record) audio content for the advertising template such that the audio content may be accepted by the advertising template. At step 819, if the system determines that the user does not wish to modify and/or re-capture (e.g., re-record) the audio content retrieved during step 817, the method may proceed back to step 808, where the system may wait to receive further customization input. If the system determines that the user wishes to modify and/or re-capture (e.g., re-record) the audio content retrieved during step 817, the method may proceed to back to step 817.

At step 820, the system may determine whether the user wishes to further customize the advertising template. During step 820, the system may process input data to determine whether the user is attempting to add further customizations to the advertising template. In some embodiments, the system may transmit a message to the user requesting whether the user wishes to further customize the advertising template. If the system determines that the user wishes to further customize the advertising template, the method may proceed back to step 808, where the system may wait to receive further customization input. If the system determines that the user does not wish to further customize the advertising template, the method may proceed to step 830.

At step 822, the system may capture and/or retrieve video content in accordance with a user customization request. In some embodiments, the system may process data received during step 808 to determine what video content should be retrieved or captured. For example, if the user wishes to customize an advertising template by adding video content (e.g., a video data file) to the template, the system may process data relating to the user's customization request in order to identify the particular video content to add to the advertising template. As another example, if the user wishes to customize an advertising template by modifying, replacing, or removing video content already in the template, the system may process data relating to the user's customization request in order to identify the video content that the user wishes to customize. For instance, the system may process data from an input device indicating the particular video content in the advertising template that the user wishes to customize (e.g., modify, replace, remove, etc.).

In one embodiment, the system may retrieve the identified video content from memory. In another embodiment, the system may retrieve the identified video content from a computing device associated with the user, such as a smartphone, tablet, computer, laptop, or other computing device. In other embodiments, during step 822, the system may determine whether the user wishes to generate new video content to add to the advertising template. The system may process customization input data (e.g., input data received during step 808) to determine whether the user wishes to generate video content for the advertising template. The system may provide the user with an interface for capturing video content via a video capturing device. In some embodiments, the system may prompt the user to perform one or more physical movements when capturing the video content. The system may retrieve the textual script from data relating to and/or associated with the advertising template.

In some embodiments, during step 822, the system may provide feedback to the user regarding whether captured video content meets or exceeds threshold performance scores and/or accuracy levels associated with the advertising template. The system may display one or more visual images and/or icons on the user interface to dynamically indicate how accurately a user is performing one or more physical movements associated with an advertising template. In other embodiments, the system may display a message, via the user interface, indicating how accurately a user is performing one or more physical movements associated with an advertising template. In another embodiment, the system may display a message, via the user interface, providing the user with one or more suggestions and/or recommendations for providing more accurate video content. For example, if the system detects that the user is not performing one or more physical movements properly (e.g., the user is not waving their arms properly), the system may provide the user with instructions or recommendations for performing the physical movement(s) and may display a textual comment or message to that effect.

At step 823, the system may determine whether the video content retrieved and/or captured during step 818 is acceptable. There are a variety of ways in which the system may determine whether retrieved and/or captured video content is acceptable (e.g., compatible/suitable) for the advertising template. In some embodiments, the system may determine whether the retrieved and/or captured video content satisfies predetermined standards, parameters, restrictions and/or thresholds associated with the advertising template retrieved during step 803. The system may process data associated with the advertising template to determine any corresponding standards, parameters, restrictions and/or thresholds for that advertising template.

In some embodiments, the system may determine whether video content retrieved during step 822 meets or exceeds predetermined quality standards for an advertising template. For example, an advertising template may require that video content added to the template must not exceed a certain file size. In other embodiments, the system may determine whether video content retrieved during step 822 is compatible and/or suitable for the advertising template. For example, an advertising template may require that video content added to the template must include one or more physical movements associated with the advertising template. The system may process video content captured during step 822 to determine whether the video content meets or exceeds a threshold level of accuracy in accordance with a performance of one or more physical movements associated with the advertising template. In other embodiments, the system may process video content captured during step 822 to determine whether the video content meets or exceeds a threshold performance score associated with the advertising template.

At step 823, if the system determines that video content retrieved and/or captured during step 822 is acceptable, the method may proceed to step 825. If the system determines that video content retrieved and/or captured during step 822 is not acceptable, the method may proceed to step 824, where the system may determine whether the user wants to modify the video content captured and/or retrieved during step 822. During step 824, the system may transmit a message to the user to modify the captured and/or retrieved video content such that it may be accepted by the advertising template. The system may include in the message one or more reasons why the video content was not accepted. The system may also transmit a message to the user including one or more recommendations for modifying the video content such that it may be accepted by the advertising template.

For example, if the captured and/or retrieved video content has a data file size that is too large (i.e. larger than the size required by the advertising template), the system may transmit a message to the user that the data file size is too large and that the user should modify the video content. In some embodiments, the system may receive user input indicating that they user wishes to modify the video content retrieved during step 811. For example, the system may receive data from an input device indicating that the user has attempted to modify the video content such that it may be accepted by the advertising template. In other embodiments, the system may receive input data indicating that the user wishes to attempt to capture (e.g., re-record) video content for the advertising template such that the video content may be accepted by the advertising template. At step 824, if the system determines that the user does not wish to modify and/or re-capture (e.g., re-record) the video content retrieved during step 822, the method may proceed back to step 808, where the system may wait to receive further customization input. If the system determines that the user wishes to modify and/or re-capture (e.g., re-record) the video content retrieved during step 822, the method may proceed to back to step 822.

At step 825, the system may determine whether the user wishes to further customize the advertising template. During step 825, the system may process input data to determine whether the user is attempting to add further customizations to the advertising template. In some embodiments, the system may transmit a message to the user requesting whether the user wishes to further customize the advertising template. If the system determines that the user wishes to further customize the advertising template, the method may proceed back to step 808, where the system may wait to receive further customization input. If the system determines that the user does not wish to further customize the advertising template, the method may proceed to step 830.

Referring back to FIG. 8A, at step 830 the system may render customized content associated with the advertising template. In some embodiments, the system may render (e.g., generate) customized advertising content by merging content retrieved during any of steps 811, 817, and/or 822 with the advertising template retrieved during step 803. In other embodiments, the system may render customized advertising content by superimposing content retrieved during any of steps 811, 817, and/or 822 with the advertising template retrieved during step 803. In one embodiment, the system may store in memory the rendered customized advertising content. In some embodiments, the system may transmit a request to the user to render the customized advertising content associated with the advertising template retrieved during step 803. In other embodiments, the system may render the customized advertising content in response to receiving input data indicating that the user wishes to render the customized advertising content associated with the advertising template retrieved during step 803.

At step 831, the system may determine whether to share the advertising content (e.g., customized advertising content) rendered during step 830. During step 831, the system may process input data corresponding to a user request to share the customized advertising content. In some embodiments, the system may determine whether to share custom content with one or more other users or groups of users based on preferences and/or parameters stored within a user profile or account. In other embodiments, the system may transmit a message requesting the user to indicate whether the customized advertising content should be shared with one or more other users or groups of users.

At step 831, if the system determines that the customized advertising content rendered during step 830 should not be shared, the method may proceed to step 834, where the system may collect and process user consumption data. If the system determines that the customized advertising content rendered during step 830 should be shared with other users or groups of users, the method may proceed to step 832, where the system may determine publishing criteria for the customized advertising content.

In one embodiment, during step 832, the system may retrieve from memory data corresponding to publishing criteria for the advertising campaign retrieved during step 803. In another embodiment, the system may retrieve from an advertising server, such as server 702, publishing criteria for the advertising campaign retrieved during step 803. The system may receive user input, via a user interface, identifying one or more preferences or criteria for publishing the advertising content associated with the advertising campaign retrieved during step 802. In other embodiments, the system may receive input data corresponding to one or more user modifications to parameters and/or criteria for publishing the customized advertising content rendered during step 830. In some embodiments, step 832 may be performed at the time the advertising campaign is retrieved and/or identified (i.e., during step 802). The system may store in memory any modifications made to any criteria or parameters for publishing the advertising content. For example, the system may store in memory any modifications or adjustments made to a user profile that corresponds to a change in user publishing preferences.

At step 833, the system may publish the customized advertising content in accordance with one or more preferences or criteria associated with an advertising campaign. The system may publish the customized advertising content in response to receiving input data corresponding to a user request to publish the customized advertising content. There are a variety of ways in which the customized advertising content may be published to one or more users or groups of users. For example, the system may publish the customized advertising content to one or more users or groups of users in accordance with data specifying publishing parameters for the advertising campaign retrieved during step 802. As another example, the system may publish the customized advertising content to users in accordance with publishing parameters or a publishing schedule, as discussed in more detail with respect to FIG. 9. As yet another example, the system may publish the customized advertising content to users in accordance with one or more preferences identified in a user's profile or account. The system may transmit the customized advertising content to one or more computing devices over a network, such as network 100 or 109.

In some embodiments, the system may publish the customized advertising content to one or more users or groups of users within a certain geographical region. For example, the system may publish the custom content locally (e.g., to users within the same city or zip-code). As another example, the system may publish the custom content nationally (e.g., to users within different states). The one or more users or groups of users receiving the published customized advertising content may consume the advertising content on a display device or other computing device (e.g., laptop, smartphone, tablet, etc.) in their respective premise. In some embodiments, the system may transmit the customized advertising content to a content server associated with a service and/or content provider. For example, the system may transmit the customized advertising content to a server, such as server 106, such that one or more users may access the customized advertising content at any time (e.g., content on demand).

In some embodiments, the system may publish the customized advertising content by dynamically inserting one or more customized ads into the media content being transmitted to consumers. Content transmitted to consumers may include one or more triggers or time-codes embedded therein to indicate where insertion opportunities exist within the content. For example, content providers may place one or more triggers in live (or linear) content to identify where ads may be placed. As another example, content providers may place one or more time-code in file-based content (e.g., on-demand content) to indicate where ad insertion opportunities exist within the content. As will be appreciated, various time-code formats (e.g., SMPTE time-codes, vertical interval time-codes, etc.), may be utilized by the system without departing from the scope of the present disclosure.

Thus, the content provider may dynamically insert customized advertising content into media content transmitted to a user based on a variety of factors (e.g., time of day, genre, ratings, content delivery method, etc.). Dynamically inserting ads into media content transmitted to users (e.g., streamed content VOD, etc.) allows content providers to more easily interchange or replace the ads that are being sent to user, and also allows the providers to more precisely and effectively target which ads are consumed by users.

For example, the system may retrieve data from a user's account or profile to determine the types and subject matter of advertising content that should be inserted into media content being transmitted to that user. As another example, the system may dynamically insert customized ads into content being transmitted to a user based on the user's method of consuming the content. In some embodiments, the system may identify and dynamically insert certain customized ads into content being transmitted to a user when that user is consuming video-on-demand ("VOD") content. Additionally or alternatively, the system may identify and dynamically insert certain customized ads into content being transmitted to a user when that user is consuming linear content (e.g., consuming content at the particular time it's offered and the particular channel it's offered on). In other embodiments, the system may distinguish the various customized ads to insert into media content being transmitted to a user based on the format in which the media is delivered to the user. For example, the system may publish certain customized advertisements to a user if media content is being delivered to the user via internet protocols ("IP"), such as video content streamed over the Internet. Additionally or alternatively, the system may publish other customized advertisements to the user if media content is being delivered to the user via a QAM format (e.g., data carried via radio frequency).

At step 834 the system may collect and process user consumption data. In some embodiments, the system may collect data corresponding to a user's consumption of advertising content (e.g., custom advertising content). The system may be configured to collect data relating to the consumption of the customized advertising content rendered during step 830, as well as advertising content that has not been customized. During step 834, the system may collect data relating to a user's consumption of advertising content by tracking and identifying each instance and/or the amount of time the user spends consuming advertising content. The computing device may be further configured to store in memory data corresponding to the consumption behavior of the user. In some embodiments, the computing device may transmit, to an advertising server, data relating to a user's consumption behavior. The system may be configured to process data relating to a user's consumption behavior in order to determine the effectiveness of the advertising content. In other embodiments, the computing device may be configured to generate consumption metrics associated with a user's consumption behavior or history. Various types of consumption metrics may be generated by the system, including the number of users who have consumed a particular advertisement, the average time spent consuming a particular advertisement, the total number of hours a user has spent consuming advertising content, and the like. Any suitable consumption metric may be generated by the system In some embodiments, the system may utilize collected (or generated) consumption data and/or metrics to generate documents and/or reports. For example, the system may generate an invoice or billing report for an entity that charges fees (e.g., subscriptions fees) based, at least in part, on a number of user views associated with advertising content provided by and/or generated by that entity. In other embodiments, the system may utilize collected (or generated) consumption data and/or metrics for use in games, competitions, challenges, or reward programs offered to users.

Figure 9:
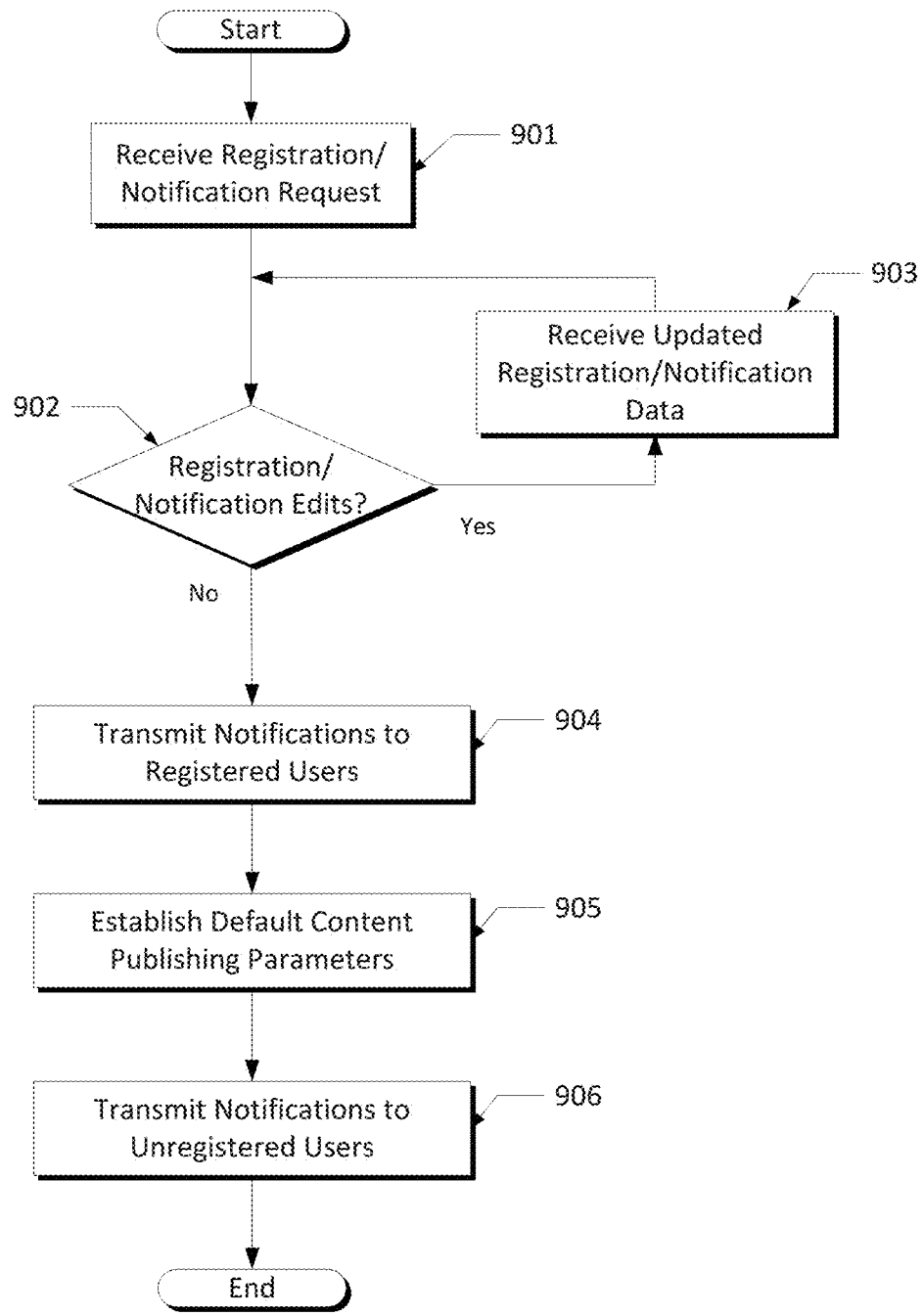
FIG. 9 illustrates an exemplary flowchart of a method in accordance with one or more aspects of the disclosure.

FIG. 9 illustrates an example method of registering for and/or establishing user notification preferences in accordance with one or more aspects of the disclosure performed by one or more computing devices, such as computing device 200, or any other suitable computing device. When describing the steps of the method below, the term "system" may be used when referring to each component, either singularly or collectively, employed at each step of the method. Such usage is merely for ease in discussing the method, and should not be interpreted as limiting the exact embodiment in which the following method may be performed.

Referring to FIG. 9, at step 901 the system may receive a registration or notification request from one or more users. The system may process input data corresponding to a user's request to register for a user account and/or user notifications. In some embodiments, users may register with the system to establish a user account or profile. A user account may permit a user to identify and establish certain user preferences, parameters, or options for utilizing and interacting with the system in accordance with at least some aspects of the disclosure described in reference to FIGS. 3A and 3B. For example, the user account/profile may permit the user to modify settings or preferences corresponding to one or more customization interfaces provided by the system. As another example, a user may establish preferences corresponding to the subject matter of content within the one or more advertising templates that may be made available to the user.

In other embodiments, during step 901, a user may register to receive notifications when certain content has been made available for consumption. In some embodiments, as will be described in more detail further below, the system may be configured to transmit notifications to a user when certain content (e.g., image content, video content, etc.) has been made available. For example, if new image content (e.g., photos) have been uploaded to or are otherwise made accessible in the system by one or more other users, the system may notify a user that the new content is now available. As another example, if one or more other users generate new customized advertising content, and subsequently publish the content, the system may send a notification to a user to indicate that the new advertising content is available for consumption. Still another example of when a user may receive a notification may include instances when an entity (e.g., advertiser) makes new advertising templates available to the users, or when the entity updates an existing advertising template.

In some embodiments, the system may provide users with an interface to register for user notifications. This interface may be provided to a user in response to the user initiating the interface, the user creating a user profile or account, or at other times when the user is operating the interface. The interface may also include one or more menus or icons that may permit a user to transmit a request to register for notifications. In other embodiments, the system may automatically register a user to receive notifications. For example, when a user first accesses a user interface for customizing advertising content, the user may automatically be registered to receive notifications, and would not be required to transmit a registration request. In this example, the automatic registration may enroll a user to receive all available notifications transmitted by the system. In some embodiments, where a user has previously registered to receive notifications, the method may skip step 901. In one of these embodiments, the system may determine whether a user has already registered for notifications by processing data associated with the user's profile or account indicating the user's registration status.

At step 902, the system may determine whether one or more registered users wish to modify or edit their respective registration (e.g., account/profile) settings and/or user notification preferences. In some embodiments, the system may transmit a message indicating whether a user wishes to modify their current registration/notification preferences or settings. In other embodiments, the system may provide a user with an interface to access and modify current registration and/or notification settings. This interface may be provided in response to the system receiving input data indicating that the user wishes to modify current registration and/or notification settings. For example, a user may have the option of editing registration settings via a user interface configured to display the user's profile and/or account settings. Such an interface may also include one or more menus or icons that may permit users to transmit a request to modify their current registration settings. This interface may also provide users with one or more menus or icons that may permit users to modify or adjust their notification settings or preferences.

At step 902, if the system determines that a registered user wishes to edit or modify their registration and/or notification settings, the method may proceed to step 903, where the system will receive updated registration and/or notification data for the user. During step 903, the system may receive input data corresponding to the one or more edits, modifications or adjustments made to a user's registration and/or notification settings. For example, the system may receive input data corresponding to a modification of how frequent (or often) a registered user wishes to receive user notifications. As another example, the system may receive input data corresponding to a modification to the one or more users or groups of users that a registered user wishes to receive notifications from. As yet another example, the system may receive input data corresponding to the user adjusting one or more settings in a user's account or profile. For instance, the system may receive input corresponding to a change in the username and/or password associated with the user's account. Additionally, the system may receive input corresponding to a change in one or more subject-matter related preferences associated with the various types of advertising content (or advertising templates) made available to the user. As will be appreciated, there are a variety of modifications that a registered user may make to their respective user profile and/or notification settings with departing from the scope of the present disclosure.

At step 902, if the system determines that a registered user does not wish to modify their registration and/or notification settings, the method may proceed to step 904, where the system may transmit notifications to one or more registered users or groups of registered users. In some embodiments, the system may transmit notifications to registered users regarding the availability of customized advertising content and/or the occurrence of user consumption achievements. In other embodiments, the system may transmit notifications to registered users in accordance with the notification settings of the one or more users that have registered to receive and/or send user notifications. For example, the system may transmit notifications to one or more registered users or groups of registered users based on the notification settings of each registered user. In some embodiments, the system may transmit user notifications to one or more registered users or groups of registered users upon receiving input data from a user corresponding to a request to transmit a user notification. In one embodiment, the system may transmit notifications, such as user consumption milestones or awards, to one or more registered users associated with a particular social media network. For example, the system may transmit a notification to registered users that have been identified by the user, via a user profile or other notification settings, as belonging to a particular social media network.

The system may retrieve data from a user's profile or notification settings indicating the various accounts, devices, or locations where a user wishes to receive user notifications. In some embodiments, the system may be configured to transmit notifications to a computing device associated with a registered user. For example, a user may indicate, via their user profile or other notification settings, that certain notifications should be transmitted to the user's smartphone, laptop, or other computing device. In other embodiments, the system may transmit notifications to an e-mail address associated with a registered user. In still other embodiments, the system may transmit notifications to a social media website account or other profile associated with a registered user.

At step 905, the system may establish default parameters for where user-generated content (e.g., advertising content) may be published. In some embodiments, the system may establish default publishing parameters indicating the various locations and/or geographic regions where customized advertising content generated by one or more users may be made available for consumption. For example, the default publishing parameters may indicate that customized advertising content should be made available to registered and/or non-registered users located in the same zip-code as the user who generated and/or published the customized advertising content. The system may establish default publishing parameters in accordance with the publishing preferences of the user that generated the customized advertising content. For example, the system may not publish to non-registered users advertising content associated with a user that has opted to only publish customized advertising content to registered users.

In other embodiments, the system may establish default publishing parameters relating to the subject matter of the customized advertising content that may be made available for consumption. For example, the default publishing parameters may indicate that customized advertising content relating to a certain type of subject matter (e.g., sports, automobiles, food, etc.) should be made available to registered and/or non-registered users. The system may process data relating to the advertising content or associated advertising campaign in order to identify or determine the corresponding subject matter type. In still other embodiments, the system may establish default publishing parameters relating to the one or more users or groups of users for which the customized advertising content should be made available for consumption. For example, the default publishing parameters may indicate that customized advertising content should be made available to one or more groups of users in accordance with a user's account or profile. The user may identify users or groups of users that should have access to customized advertising generated by the user. As another example, the default publishing parameters may indicate that customized advertising content should be made available to all registered and non-registered users.

In some embodiments, users may subsequently modify or adjust default content publishing parameters established by the system. In some embodiments, a user may modify default content publishing parameters when generating or customizing an advertising campaign in accordance with one or more aspects of the present disclosure as described in reference to FIG. 3E. For example, a user may edit content publishing parameters relating to the various geographic regions where advertising content may be made available for consumption by registered and/or non-registered users.

At step 906, the system may transmit notifications to one or more non-registered users. In some embodiments, the system may transmit notifications to one or more non-registered users regarding the availability of customized advertising content and/or the occurrence of user consumption achievements. In some embodiments, the system may notify one or more non-registered users that a registered user has made customized advertising content available for consumption. For example, the system may transmit a message to one or more non-registered user's email addresses indicating that the registered user has made customized advertising content available for consumption. The system may also include in the transmitted message a preview (or segment) of the customized advertising content for the non-registered user to consume. Including a segment or portion of the customized advertising content in the message may encourage the non-registered user to attempt to consume the entire customized advertising content, or in some instances, register with the system to consume the remainder of the customized advertising content.

In one of these embodiments, the system may transmit the notification to non-registered in accordance with one or more notification settings and/or publishing preferences (or criteria) of the registered user. In other embodiments, the system may transmit notifications, such as user consumption milestones or awards, to one or more non-registered users associated with a particular social media network. In some embodiments, the system may transmit user notifications to non-registered users or groups of non-registered users upon receiving input data from a registered user corresponding to a request to transmit user notifications to non-registered users.

In some embodiments, the system may retrieve data from a registered user's profile or notification settings indicating the various accounts, devices, or locations where notifications should be transmitted to non-registered users. For example, a registered user may indicate, via their user profile or other notification settings, that certain notifications should be transmitted to the smartphone, laptop, or other computing device of certain non-registered users or groups of non-registered users.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method comprising:
   obtaining, by a computing device, an advertising template associated with non- customized advertising content that is to be output during output of a content stream, wherein the advertising template comprises video content and a textual script;
   receiving a user customization request to add audio content to the advertising template;
   capturing audio data, provided by a user, of a reading of the textual script;
   determining, by the computing device, that the audio data satisfies one or more accuracy or performance score thresholds associated with the textual script;
   generating, based on the determining that the audio data satisfies the one or more accuracy or performance score thresholds, based on the advertising template, and based on the audio data, customized advertising content in accordance with the user customization request;
   determining availability of the customized advertising content based on a privacy indication by the user; and
   outputting, during the output of the content stream and based on the availability, the customized advertising content in place of the non-customized advertising content.

2. The method of claim 1, further comprising:
   recommending, based in part on content preferences stored in a user profile, advertising content for the user to add to the advertising template.

3. The method of claim 1, wherein the generating is further based on the audio data satisfying at least one of: one or more file size restrictions, one or more content type restrictions, or one or more content subject matter restrictions.

4. A method comprising:
   receiving, by a computing device, information indicating an original advertisement that is to be presented during output of a primary content item;
   providing a user with:
      a first option to include the original advertisement during output of the primary content item; and
      a second option to include a custom version of the original advertisement during
   output of the primary content item;
   based on user selection of the second option, obtaining, by the computing device, an advertising template comprising video content and a textual script corresponding to the original advertisement;
   receiving an audio recording of the user reading the textual script;
   generating, based on determining that the audio recording is accurate based on an audio template associated with the textual script, the custom version of the original advertisement, wherein the custom version of the original advertisement comprises the audio recording instead of an original audio in the original advertisement;
   determining availability of the custom version of the original advertisement based on a privacy indication by the user; and
   outputting, based on the availability, the custom version of the original advertisement.

5. The method of claim 4, further comprising:
   receiving digital content, provided by the user, for integrating with the original advertisement, wherein the digital content comprises at least one of: image content, audio content, or video content.

6. The method of claim 4, further comprising:
   receiving digital content, provided by the user, for integrating with the original advertisement, wherein the digital content comprises at least one of: image content, audio content, or video content, and wherein the generating comprises:
   generating the custom version of the original advertisement by combining the digital content with the original advertisement.

7. The method of claim 4, further comprising:
determining, based on the audio recording, a performance score, wherein the generating comprises:
generating the custom version of the original advertisement by combining, based on determining that the performance score satisfies a performance score threshold, the recording with the original advertisement.

8. The method of claim 4, further comprising:
determining one or more customization opportunities associated with the original advertisement; and
visually emphasizing, on a display device and based on the one or more customization opportunities, one or more portions of the original advertisement.

9. The method of claim 4, further comprising:
sending a notification to one or more consumers- that the user has recorded a custom version of an advertisement in a primary content item.

10. The method of claim 4, wherein the outputting the custom version of the original advertisement further comprises:
sending the custom version of the original advertisement via a network in accordance with one or more user content filters.

11. The method of claim 4, further comprising:
establishing, based on user input or one or more preferences of the user, a schedule for publishing the custom version of the original advertisement.

12. The method of claim 4, further comprising:
receiving a user request to modify a portion of the original advertisement; and
denying, based on one or more rules associated with the portion of the original advertisement, the user request.

13. A method comprising:
obtaining, by a computing device, advertising content that is to be output during output of a content stream;
receiving a customization request to add image content to the advertising content;
receiving image data, from a user;
customizing, based on the received image data, the advertising content in accordance with the customization request;
determining availability of the customized advertising content based on a privacy indication by the user; and
outputting, during the output of the content stream and based on the availability, the customized advertising content in place of the advertising content.

14. The method of claim 13, further comprising:
receiving a plurality of customization requests from a plurality of users to modify at least a portion of the advertising content.

15. The method of claim 13, further comprising:
monitoring consumption of the customized advertising content by one or more consumers; and
presenting, based on a level of consumption associated with the customized advertising content, a reward.

16. The method of claim 13, further comprising unlocking, based on a level of consumption associated with the customized advertising content, one or more customization tools for a user interface.

17. The method of claim 1, wherein the determining that the audio data satisfies the one or more accuracy or performance score thresholds associated with the textual script further comprises:
providing, for display, an indication of one or more audio metrics for a performance score associated with the reading of the textual script.

18. The method of claim 4, further comprises:further comprising:
providing, for display, an indication of a level of accuracy of the audio recording compared with the audio template, wherein the audio template comprises a reading of the textual script.

19. The method of claim 1, wherein the non-customized advertising content is inserted into the content stream transmitted to a plurality of users by a content provider.

20. The method of claim 1, wherein:
the privacy indication indicates one or more users who may view the customized advertising content, and
the outputting comprises outputting the content stream with the customized advertising content to the one or more users.

21. The method of claim 1, further comprising outputting, based on a selection by the user, the customized advertising content to one or more other users.

22. The method of claim 1, wherein the privacy indication indicates that the customized advertising content is private to the user.

23. The method of claim 1, further comprising denying permission to a second user, who has not been granted access to the customized advertising content by the privacy indication, to view the customized advertising content.

24. The method of claim 1, further comprising:
sending a notification to one or more additional users that the user has recorded the customized advertising content in the content stream; and
sending, to the one or more additional users, the content stream with the customized advertising content.

25. The method of claim 1, further comprising:
granting, based on the privacy indication, permission to allow a second user to further customize the customized advertising content; and
outputting, based on the privacy indication, the customized advertising content for the second user.

26. The method of claim 1, wherein the generating the customized advertising content is further based on determining that the user has been granted permission to customize the advertising template.

27. The method of claim 1, wherein:
the advertising template comprises customized advertising content based on another user customization request of another user; and
the generating the customized advertising content is further based on determining that the user is not restricted from further customizing the customized advertising content based on the another user customization request.

28. The method of claim 1, wherein:
the advertising template comprises customized advertising content based on another user customization request of another user; and
the generating the customized advertising content is further based on determining that the audio data is not restricted from integration with the customized advertising content based on the another user customization request.

29. The method of claim 1, further comprising:
analyzing the audio data, based on audio information associated with the textual script, to determine one or more accuracy levels or performance scores; and
outputting assistive directions, based on the one or more accuracy levels or performance scores, to the user,
wherein the determining that the audio data satisfies one or more accuracy or performance score thresholds associated with the textual script is based on the one or more accuracy levels or performance scores.

30. The method of claim 1, wherein the determining that the audio data satisfies one or more accuracy or performance score thresholds associated with the textual script comprises comparing the captured audio data of the reading of the textual script with audio data corresponding to the advertising template and corresponding to an exemplar reading of the textual script.

31. The method of claim 1, wherein the determining that the audio data satisfies one or more accuracy or performance score thresholds associated with the textual script comprises:
determining a ratio of a performance metric of the captured audio data of the reading of the textual script to a performance metric of audio data corresponding to the advertising template and corresponding to an exemplar reading of the textual script; and
determining that the ratio satisfies a corresponding performance score threshold.

32. The method of claim 1, wherein the determining that the audio data satisfies one or more accuracy or performance score thresholds associated with the textual script comprises comparing the captured audio data of the reading of the textual script with audio data corresponding to a speech synthesis of the textual script.

33. The method of claim 1, wherein the advertising template comprises an audio portion corresponding to the textual script, and the generating the customized advertising content comprises replacing the audio portion with the captured audio data.

34. The method of claim 14, wherein:
the image data is associated with a body mimicking a template pose associated with the advertising content, and
the method further comprises:
determining that the received image data satisfies an accuracy or performance score threshold associated with the template pose.

35. The method of claim 13, further comprising:
providing the user with an option of replacing an image of a person in the advertising content with an image of the user.

* * * * *

UNITED STATES PATENT AND TRADEMARK OFFICE
CERTIFICATE OF CORRECTION

PATENT NO. : 11,151,614 B2
APPLICATION NO. : 14/498541
DATED : October 19, 2021
INVENTOR(S) : Bradley et al.

It is certified that error appears in the above-identified patent and that said Letters Patent is hereby corrected as shown below:

In the Specification

Column 2, Brief Description of the Drawings, Line 31:
After "disclosure", insert --.--

Column 2, Brief Description of the Drawings, Line 34:
After "disclosure", insert --.--

Column 11, Detailed Description, Line 6:
Delete "10$a$," and insert --10 am,-- therefor Column 12, Detailed Description, Line 67:
Delete "7D," and insert --7C,-- therefor Column 14, Detailed Description, Line 54:
Delete "431)." and insert --432).-- therefor Column 14, Detailed Description, Line 67:
Delete "431)" and insert --432)-- therefor Column 22, Detailed Description, Line 41:
Delete "400" and insert --401-- therefor Column 30, Detailed Description, Line 32:
Delete "7$a$," and insert --7A,-- therefor Column 31, Detailed Description, Line 5:
Delete "710" and insert --711-- therefor Signed and Sealed this
Ninth Day of May, 2023

Katherine Kelly Vidal
*Director of the United States Patent and Trademark Office*

Column 45, Detailed Description, Line 53:
After "system", insert --.--

In the Claims

Column 49, Line 60:
In Claim 1, delete "non- customized" and insert --non-customized-- therefor Column 50, Line 33:
In Claim 4, after "during", delete "¶"

Column 51, Line 7:
In Claim 7, before "recording", insert --audio--

Column 51, Line 16:
In Claim 9, delete "consumers-" and insert --consumers-- therefor Column 51, Line 39:
In Claim 13, delete "data," and insert --data-- therefor Column 52, Line 1:
In Claim 18, after "further", delete "comprises:further"

Column 54, Line 9:
In Claim 34, delete "claim 14," and insert --claim 13,-- therefor